United States Patent

Takada et al.

[11] Patent Number: 6,038,093
[45] Date of Patent: *Mar. 14, 2000

[54] MAGNETIC RECORDING/REPRODUCING APPARATUS WITH A CURRENT SUPPLYING CIRCUIT FOR DEMAGNETIZING RESIDUAL MAGNETIZATION REMAINING AT AN END OF A MAGNETIC POLE

[75] Inventors: Noboru Takada; Chie Takeda; Hiroaki Wakamatsu; Masayoshi Shinohara; Kenji Sato; Kenichi Aoshima, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/880,518

[22] Filed: Jun. 24, 1997

Related U.S. Application Data

[62] Division of application No. 08/851,809, May 6, 1997, which is a continuation of application No. 08/305,093, Sep. 13, 1994, abandoned.

[30] Foreign Application Priority Data

Sep. 17, 1993 [JP] Japan .................................. 5-231423
Aug. 17, 1994 [JP] Japan .................................. 6-193394

[51] Int. Cl.$^7$ ............................. G11B 5/465; H01F 13/00
[52] U.S. Cl. ............................. 360/66; 361/149; 361/267
[58] Field of Search ................................. 360/45, 46, 62, 360/66, 113, 126, 123, 124, 54; 361/149, 154, 267

[56] References Cited

U.S. PATENT DOCUMENTS

| | | |
|---|---|---|
| 4,651,235 | 3/1987 | Morita et al. .............................. 360/46 |
| 4,786,991 | 11/1988 | Yamamori .................................. 360/66 |
| 4,799,115 | 1/1989 | Rogers et al. ............................. 360/66 |
| 4,970,621 | 11/1990 | Gailbreath et al. ....................... 360/46 |
| 5,038,230 | 8/1991 | Kusunoki et al. ......................... 360/46 |
| 5,053,892 | 10/1991 | Supino, Jr. et al. ...................... 360/62 |
| 5,168,395 | 12/1992 | Klaassen et al. .......................... 360/46 |
| 5,168,409 | 12/1992 | Koyama et al. .......................... 360/113 |
| 5,187,628 | 2/1993 | Kanai et al. ............................. 360/126 |
| 5,383,064 | 1/1995 | Harman ..................................... 360/45 |
| 5,392,169 | 2/1995 | Argyle et al. ............................. 360/45 |
| 5,436,772 | 7/1995 | Sekiya et al. ............................ 360/113 |
| 5,465,186 | 11/1995 | Bajorek et al. .......................... 360/113 |

FOREIGN PATENT DOCUMENTS

| | | |
|---|---|---|
| 61-131203 | 6/1986 | Japan . |
| 1263903 | 10/1989 | Japan . |
| 4286701 | 10/1992 | Japan . |
| 540918 | 2/1993 | Japan . |
| 581604 | 4/1993 | Japan . |
| 5-225526 | 9/1993 | Japan . |

*Primary Examiner*—David L. Ometz
*Attorney, Agent, or Firm*—Greer, Burns & Crain, Ltd.

[57] ABSTRACT

There is provided a magnetic recording/reproducing apparatus which has an improved reliability for a reproduced signal by eliminating a deformation in a reproduced signal waveform due to a residual magnetization generated in a magnetic head. The magnetic recording/reproducing apparatus has a magnetic recording medium including a magnetic film to which information is magnetically recorded and a thin-film magnetic head including a magnetic pole and a coil provided around the magnetic pole. A current supplying circuit supplies a current to the coil so that a magnetic state of the magnetic pole is stabilized. The current is supplied to the coil after a recording operation has been completed by the thin-film magnetic head. The current may demagnetize the magnetic pole of the magnetic head, or stabilize the magnetic state of the magnetic pole.

8 Claims, 25 Drawing Sheets

FLOATING SURFACE

Fig. 25
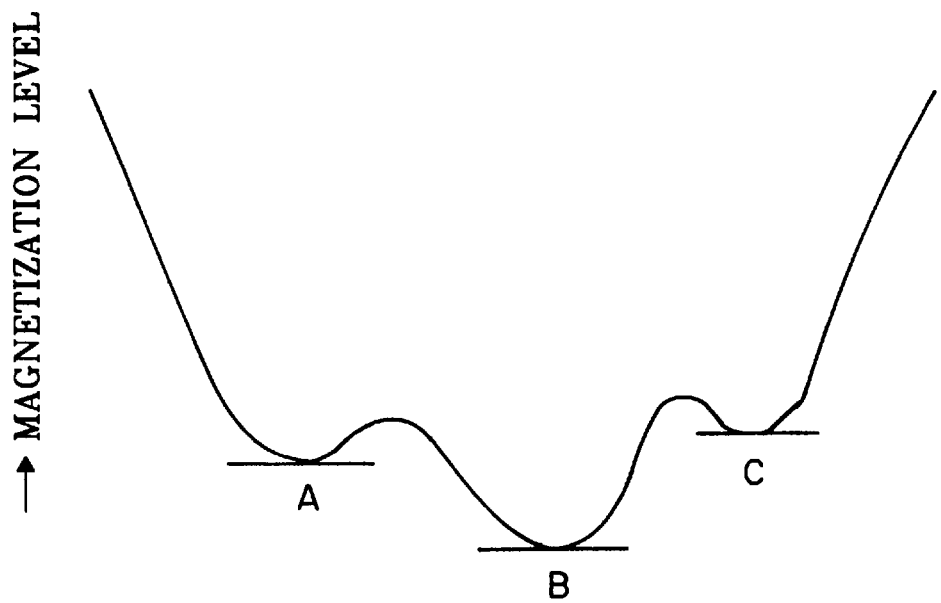
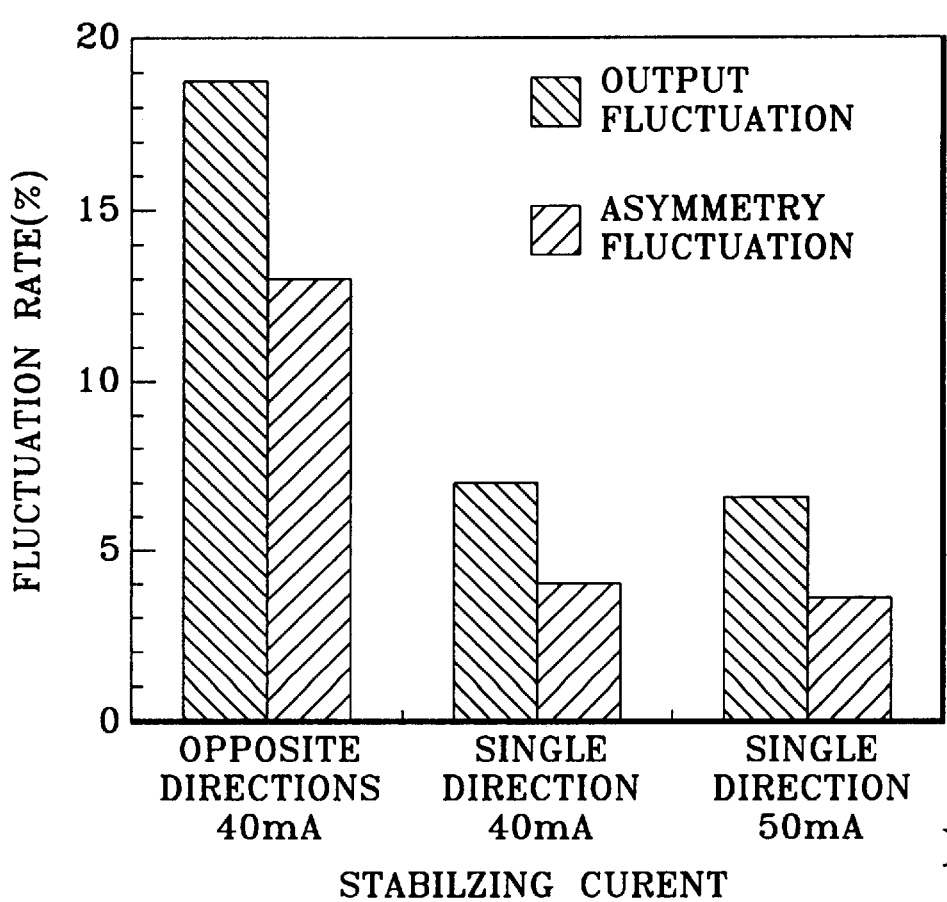
Fig. 26

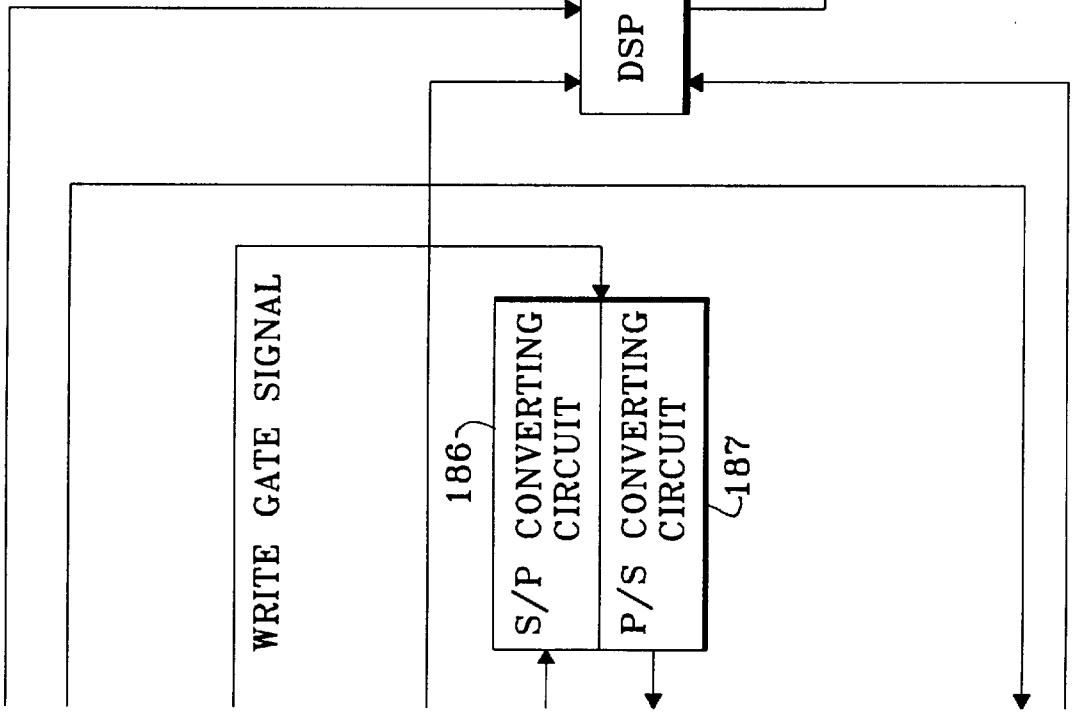

Fig. 34

| HEAD NO. | OUTPUT CHANGE (Ave.) [%] | | | |
|---|---|---|---|---|
| | 1MFRPS | 10.5MFRPS | 63MFRPS | DC ERASE |
| 1 | −10.8⇒+4.3<br>15.1%UP | — | — | — |
| 2 | −14.1⇒−5.5<br>8.6%UP | −23.1⇒−5.4<br>28.5%UP | −14.9⇒−9.9<br>5.0%UP | −13.4⇒+2.4<br>15.8%UP |
| 3 | −12.4⇒−6.6<br>5.8%UP | −10.1⇒+0.5<br>10.6%UP | −15.8⇒−7.7<br>7.3%UP | — |
| 4 | −11.6⇒+5.0<br>16.6%UP | −24.3⇒−7.8<br>16.5%UP | −20.3⇒−6.5<br>13.8%UP | — |
| 5 | −17.0⇒+0.9<br>17.9%UP | — | — | — |
| Ave. | 12.8%UP | 18.5%UP | 8.7%UP | 15.8%UP |
| MEASUREMENTS | 100 | 60 | 51 | 20 |
| OUTPUT UP<br>DN | 98/100(98%)<br>2/100( 2%) | 59/60 (98.3%)<br>1/60 ( 1.7%) | 34/51 (66.7%)<br>17/51 (33.3%) | 20/20 (100%)<br>0/20 ( 0%) |
| OUTPUT ABOVE AVERAGE | 48/100(48 %) | 30/60 (50 %) | 11/51(21.6%) | 13/20 (65 %) |

| DUMMY WRITE | PROBABILITY OF OUTPUT INCREASE |
|---|---|
| 10 μs | 63.3 (35.8) |
| 20 μs | 86.0 (54.0) |
| 30 μs | 91.7 (65.8) |

Fig. 35

MAGNETIC RECORDING/REPRODUCING APPARATUS WITH A CURRENT SUPPLYING CIRCUIT FOR DEMAGNETIZING RESIDUAL MAGNETIZATION REMAINING AT AN END OF A MAGNETIC POLE

This is a divisional of application Ser. No. 08/851,809 filed on May 7, 1997, pending which is a File Wrapper Continuation of Ser. No. 08/305,093 which was filed on Sep. 13, 1994, now abandoned

BACKGROUND OF THE INVENTION

1. Field of the Invention

The present invention generally relates to a magnetic recording/reproducing apparatus and method, and more particularly to a magnetic recording/reproducing apparatus and method having an improved reliability for a reproduced signal by eliminating a deformation in a reproduced signal waveform due to a residual magnetization generated in a magnetic head.

In recent years, since an amount of information processed by a computer system is increased, information recorded by a magnetic disk apparatus is increased. Downsizing and large recording capacity are desired for the magnetic disk apparatus, and thus a magnetic disk apparatus having a high recording density and a high performance are required.

2. Description of the Related Art

FIG. 1 is an illustration of an essential part of a conventional magnetic disk apparatus. In FIG. 1, a magnetic disk 11 comprises a non-magnetic substrate 12, a Cr film 13 formed on the substrate 12 and a magnetic recording film 14 formed on the Cr film 13. The substrate 12 is made of an aluminum plate having a surface processed by means of NiP plating. The magnetic recording film 14 is made of a CoCr film, and has a magnetic anisotropy in a direction longitudinal to a surface of the magnetic disk 11.

A thin-film type magnetic head 21 comprises a non-magnetic substrate 22, a first magnetic pole 23, a coil 25 and a second magnetic pole 26. The non-magnetic substrate 22 comprising $Al_2O_3$ acts as a slider. The first magnetic pole 23 comprising a NiFe film is formed on the non-magnetic substrate 22. The second magnetic pole 26 comprising a NiFe film is formed on the first magnetic pole 23 with the coil 25 covered with an insulation film 24 therebetween. A first end of each of the first magnetic pole 23 and the second magnetic pole 26 faces the surface of the magnetic disk 11. The second end of each of the first magnetic pole 23 and the second magnetic pole 26 is connected to each other so that a magnetic flux path is formed. The first magnetic pole 23, the second magnetic pole 26 and the coil 25 are covered with a protective film 27. The magnetic head 21 is so called a ring-magnetic-pole induction type magnetic head.

The first magnetic pole 23 and the second magnetic pole 26 are magnetized by supplying a recording signal current to the coil 25 of the magnetic head 21. A magnetic recording is performed on the magnetic recording film 14 of the magnetic disk 11 by means of a magnetic flux leaking in a gap formed between the first end of each of the first magnetic pole 23 and the second magnetic pole 26.

Additionally, the first magnetic pole 23 and the second magnetic pole 26 are magnetized by a magnetic flux leaking from a magnetized portion of the magnetic recording film 14. Accordingly, reproducing of information can be performed by detecting a voltage signal generated in the coil 25 due to a magnetization of the first magnetic pole 23 and the second magnetic pole 26.

In order to improve a recording/reproducing efficiency of the magnetic head 21, the first magnetic pole 23 and the second magnetic pole 26 are required to have a soft magnetic property.

Additionally, in recent years, a magnetoresistance type thin-film head (MR head) exclusively used as a reproducing head has become of great interest because the MR head can obtain a high reproduction output regardless of a rotation speed of the magnetic disk. A composite thin-film magnetic head is suggested which comprises the ring-magnetic-pole induction type thin-film magnetic head and the MR head integrally formed with each other.

FIG. 2A is an illustration for explaining a conventional composite thin-film magnetic head. FIG. 2B is a partial cross-sectional view of the magnetic head shown in FIG. 2A. FIG. 3 is a bottom view of the magnetic head shown in FIG. 2A.

The composite thin-film magnetic head 30 shown in FIG. 2A comprises an electromagnetic conversion head (recording head) 37 and the MR head 31 (reproducing head). The MR head 31 comprises an MR element 33 formed on a non-magnetic substrate 32, a conductive layer 34 and lower and upper magnetic shielding layers 35a, 35b.

A center portion of the conductive layer 34 is removed in a longitudinal direction, and each end of the conductive layer 34 is connected to the MR element 33. The conductive layer 34 and the MR element 33 are sandwiched between the lower magnetic shielding layer 35a and the upper magnetic shielding layer 35b via non-magnetic insulating layers 36.

The electromagnetic conversion head (inductive head) 37, which performs a recording operation on the magnetic disk 11, comprises the upper magnetic shielding layer 35a as a first magnetic pole, an insulating layer 39, a thin-film coil 40 and an upper magnetic pole 41 as a second magnetic pole. Additionally, the upper magnetic pole 41 is covered with a protective insulating layer 42. A recording gap 38 is formed between an end of the first magnetic pole 35a and an end of the second magnetic pole 41. The recording operation is performed by a magnetic flux formed by the recording gap 38.

FIG. 4 is a cross-sectional view of a conventional MR element and conductive layers. The MR element 33 comprises a soft magnetic layer 33a, a non-magnetic intermediate layer 33b and an MR-layer 33c. The soft magnetic layer 33a having a thickness of 300 Angstroms is formed of a soft adjacent layer (SAL) made of NiFeCr. The non-magnetic intermediate layer 33b having a thickness of 100 Angstroms is made of Ta. The MR layer 33c having a thickness of 300 Angstroms is made of NiFe.

A conductive layer 34a is formed on one side of the MR layer 33c, and another conductive layer 34b is formed on the other side of the MR layer 33c. A space of 4 $\mu$m is formed as a sensing area between the conductive layers 34a and 34b. The conductive layer 34a comprises an FeMn layer 34a1 formed on the MR layer 33c, a Ta (tantalum) layer 34a2 formed on the FeMn layer 34a1 and a W layer 34a3 formed on the Ta layer 34a2. Similar to the conductive layer 34a, the conductive layer 34b comprises an FeMn layer 34b1 formed on the MR layer 33c, and a Ta layer 34b2 formed on the FeMn layer 34b1 and a W layer 34b3 formed on the Ta layer 34b2.

The MR head 31 utilizes a resistance of the MR layer 33c which is dependent on a relative angle θ formed between a direction Mn of magnetization according to a magnetic field formed on the magnetic disk 11 and a direction Mi of a sensing current flowing in the MR layer 33c.

That is, a magnetic vector of the MR element 33 is rotated according to the direction of magnetization of the magnetic disk 11, and thereby the resistivity against the sensing current is varied. The resistivity varies in accordance with a square of a cosine of an angle formed between the magnetic vector and a current vector, and thus the resistivity is represented by the following expression.

$$\rho = \rho + \Delta\rho_{max} \cos^2 \theta \quad (1)$$

where $\rho$ is resistivity and $\Delta\rho_{max}$ is a maximum variation of the resistivity.

According to the above expression, if the directions of magnetization and current are coincident initially, an initial variation of the resistivity due to magnetization of a recording medium is small. Accordingly, the magnetic vector of the MR element is inclined by 45 degrees so that an MR sensor can be used with a high sensitivity and a good linearity.

When the MR sensor passes a magnetized portion of the recording medium, an electric signal is generated according to a sensitivity characteristic of the MR element, and thus a signal recorded on the recording medium can be read.

FIG. 5 is an illustration of an essential part of another conventional magnetic disk apparatus. In FIG. 5, parts that are the same as the parts shown in FIGS. 1 and 2B are given the same reference numerals, and descriptions thereof will be omitted.

A composite thin-film magnetic head 51 shown in FIG. 5 has an additional flux guide 52 positioned between the first magnetic pole 35a and the lower magnetic shielding layer 35b. The flux guide is made of NiFe alloy film. An end of the flux guide 52 faces the magnetic disk 11, and the other end is magnetically connected to the MR element 33.

In the magnetic head 51, a magnetic flux formed on the magnetic disk 11 is supplied to the MR element 33 via the flux guide 52. The provision of the flux guide 52 is to prevent damage of the MR element 33 or of a surface of the magnetic disk 11 due to a leakage of the sensing current flowing in the MR element when the magnetic head makes a contact with the surface of the magnetic disk 11.

A description will now be given of problems that lie in the conventional magnetic disc apparatus.

In the conventional magnetic disk apparatus having the magnetic head shown in FIG. 1, after a recording operation is performed by supplying electric current to the coil 25, a residual magnetization remains in the first and second magnetic poles 23, 26. Accordingly, when performing a reproducing operation after the recording operation, the reproducing operation is performed in a state where the first and second magnetic poles have the residual magnetization.

In such a case, magnetization of the first and second magnetic poles 23 and 26 according to a magnetic flux generated by a magnetization of the magnetic disk 11 may not be performed smoothly. That is, a reproducing signal waveform obtained by magnetization of the first and second magnetic poles 23 and 26 may have an irregular deformation, and thus an error may be generated in a reproducing signal.

This condition is caused by an irregular and unsmooth movement of a domain wall due to a pinning effect generated by an impurity or a defect and the residual magnetization existing near the end of the magnetic poles. The pinning effect is an irregular movement of the domain wall according to an energy condition due to a blockage of a smooth movement of the domain wall.

This problem happens, in particular, in a combination of a single magnetic-pole type vertical magnetic head and a double-layer construction magnetic disk having a soft magnetic backing layer and a vertical recording layer having a magnetic anisotropy in a vertical direction.

Additionally, there is a problem that a sharp and high level noise, generally called a wiggle noise or a popcorn noise, may be generated due to a movement of the domain wall. This noise is generated when a part of the domain wall suddenly moves from an unstable position to a stable position in a short time after a reproducing operation is started. The wiggle noise is indicated by (a) of a reproducing signal waveform shown in FIG. 6A, and the popcorn noise is indicated by (b) of a reproducing signal waveform shown in FIG. 6B.

In order to eliminate the above-mentioned problems, Japanese Patent Application No. 3-52520 (Japanese Laid-Open Patent Application No. 4-286701) of the present applicant discloses a technique in which a weak current is supplied before starting a reproducing operation so as to move the domain wall from an unstable position to a stable position, and thus preventing generation of the popcorn noise at an initial stage of the reproducing operation.

When the domain wall is pinned by a presence of an impurity or a defect, a current is supplied which is sufficient for generating a magnetic field by which the magnetic poles are magnetically saturated. However, such a current may generate a residual magnetization.

Additionally, since the magnetic field intensity at an end of the magnetic pole is high asthimagneticpole becomes thin toward the end particulary where, the generated magnetic field at the end of the magnetic pole may demagnetize a magnetization recorded on the magnetic disk, in particular, in the case in which a single magnetic pole of a vertical magnetic recording type thin-film vertical magnetic head is used.

Magnetic apparatuses of which magnetic heads are shown in FIGS. 2A and FIG. 5 also have the same problems mentioned above. That is, for example, since the flux guide 52 shown in FIG. 5 is adjacent to the first magnetic pole 35a, the residual magnetization is generated due to a magnetic field generated when a recording operation is performed.

FIG. 7 is an illustration of an end of the magnetic pole 35a shown in FIG. 5 for explaining the residual magnetization. FIG. 8 is a waveform of a signal output from the MR head 33 shown in FIG. 5.

When the residual magnetization is generated, as shown in FIG. 7, at the end of the magnetic shielding layer 35a (first magnetic pole), and when the residual magnetization is also generated in the flux guide 52, domains in the MR element 31 become irregular and magnetization of the end of the flux guide 52 is not smoothly varied.

In such a condition, a fluctuation is generated in a read waveform of the MR head, and an upper portion and a lower portion of the read waveform become asymmetric. This causes deformation of a reproducing signal waveform, resulting in an occurrence of an error.

In order to eliminate the above-mentioned problem, the sensing current is adjusted for each MR head provided in a magnetic disk apparatus. However, according to this method, an appropriate current cannot be obtained for each MR head due to tolerance of each MR head, and thus the asymmetry of the read waveform cannot be completely eliminated. Thus, a highly reliable waveform-reproduction system for the MR head cannot be obtained.

SUMMARY OF THE PRESENT INVENTION

It is a general object of the present invention to provide a magnetic recording/reproducing apparatus and method in which the above-mentioned problems are eliminated.

A more specific object of the present invention is to provide a magnetic recording/reproducing apparatus and method which have an improved reliability for a reproduced signal by eliminating a deformation in a reproduced signal waveform due to a residual magnetization generated in a magnetic head.

In order to achieve the above-mentioned objects, there is provided according to one aspect of the present invention, a magnetic recording/reproducing apparatus comprising:

- a magnetic recording medium comprising a magnetic film to which information is magnetically recorded;
- a thin-film magnetic head, comprising a magnetic pole and a coil provided around the magnetic pole, for recording/reproducing information to/from the magnetic recording medium; and
- a current supplying circuit which supplies a current to the coil so that a magnetic state of the magnetic pole is stabilized, the current being supplied to the coil after a recording operation has been completed by the thin-film magnetic head.

According to the above-mentioned invention, the magnetic state of the magnetic pole can always be in a uniform state when a reading operation is performed by the thin-film magnetic head, and thus a stable reproducing signal can be obtained.

Additionally, there is provided according to another aspect of the present invention a magnetic recording/reproducing apparatus comprising:

- a magnetic recording medium comprising a magnetic film to which information is magnetically recorded;
- a composite thin-film magnetic head comprising a recording magnetic head element and a reproducing magnetic head element, the recording magnetic head element recording information to the magnetic recording medium by means of a recording current supplied to a coil provided in the recording magnetic head element, the reproducing magnetic head element comprising a flux guide guiding a magnetic flux generated on the magnetic recording medium and a magnetoresistance element connected to the flux guide so as to produce a reproducing signal according to the magnetic flux guided by the flux guide, a demagnetizing coil being provided around the flux guide; and
- a current supplying circuit which supplies a demagnetizing current to the demagnetizing coil so as to demagnetize the flux guide, the current supplied to the demagnetizing coil flowing in a direction opposite to a flowing direction of the recording current previously supplied to the recording magnetic head element.

According to the above-mentioned invention, the flux guide can always be in a demagnetized state when a read operation is performed by the thin-film magnetic head, and thus a reproducing signal generated by the thin-film magnetic head has no error due to an unstable state of a magnetic pole.

Additionally there is provided according to another aspect of the present invention a magnetic recording/reproducing apparatus comprising:

- a magnetic recording medium comprising a backing layer made of a soft magnetic material and a vertical recording film formed on the backing layer, the vertical recording film has a magnetic anisotropy in a direction perpendicular to a recording surface of the magnetic recording medium,
- a composite thin-film magnetic head comprising a recording magnetic head element having a single magnetic pole and a reproducing magnetic head element, the recording magnetic head element recording information to the magnetic recording medium by means of a recording current supplied to a coil provided to the single pole, the reproducing magnetic head element comprising a magnetoresistance element magnetically connected to the single pole so as to produce a reproducing signal according to a magnetic flux guided by the single pole serving as a flux guide; and
- a current supplying circuit which supplies a demagnetizing current to the coil, before the composite thin-film magnetic head performs a reading operation, so as to demagnetize a residual magnetization remaining on an end of the single magnetic pole, the current supplied to the coil flowing in a direction opposite to a flowing direction of a last recording current previously supplied to the recording magnetic head element.

According to the above-mentioned invention, the single magnetic pole can always be in a demagnetized state when a read operation is performed by the thin-film magnetic head, and thus a reproducing signal generated by the thin-film magnetic head has no error due to an unstable state of the magnetic pole.

Additionally there is provided according to another aspect of the present invention a magnetic recording/reproducing apparatus comprising:

- a magnetic recording medium comprising a magnetic film to which information is magnetically recorded;
- a composite thin-film magnetic head comprising a recording magnetic head element and a reproducing magnetic head element arranged along a longitudinal direction of the composite thin-film magnetic head, the recording magnetic head element recording information to the magnetic recording medium by means of a recording current supplied to a coil provided in the recording magnetic head element, the recording magnetic element comprising a first magnetic pole and a second magnetic pole which serves as a magnetic shield so that a magnetic flux passes therethrough when the recording current is supplied to the coil, the reproducing magnetic head element generating a reproducing signal according to a magnetic flux which is provided by the magnetic recording medium and guided by the second magnetic pole; and
- a stabilizing current supplying circuit which supplies a stabilizing current to the coil of the recording magnetic head element so as to stabilize a magnetized state of the magnetic shield before a reading operation is performed by the reproducing magnetic head element.

According to the above-mentioned invention, the magnetic state of the magnetic shield can always be in a stable state when a reading operation is performed by the thin-film magnetic head, and thus a stable reproducing signal can be obtained.

Additionally, there is provided according to another aspect of the present invention a magnetic recording/reproducing apparatus comprising:

- a magnetic recording medium comprising a magnetic recording film to which information is magnetically recorded;
- a composite thin-film magnetic head comprising a recording magnetic head element and a reproducing magnetic head element arranged along a longitudinal direction of the composite thin-film magnetic head, the recording magnetic head element recording information to the magnetic recording medium by means of a recording current supplied to a coil provided in the recording magnetic head element, the recording magnetic element comprising a first magnetic pole and a second magnetic pole which serves as a magnetic shield so that a magnetic flux passes therethrough when the recording current is supplied to the coil, the reproducing magnetic head element comprising a magnetoresistance element connected to the second magnetic pole so as to produce a reproducing signal according to a magnetic flux which is provided by the magnetic recording medium and guided by the second magnetic pole; and quasi recording information outputting unit for outputting a current corresponding to a quasi recording information to the coil of the magnetic recording head element when a predetermined number of reading errors have occurred in a reading operation performed by the magnetoresistance head element, the quasi recording information being recorded to a predetermined area of the magnetic recording medium so that a magnetized state of the second magnetic pole is stabilized.

According to the above-mentioned invention, the second magnetic pole which guides the magnetic flux generated on the recording medium can be in a stable magnetized state when a reading operation is performed by the magnetoresistance element, and thus a stable reproducing signal can be obtained.

Additionally, there is provided according to another aspect of the present invention a magnetic recording/reproducing method performed by a magnetic recording/reproducing apparatus comprising:

a magnetic recording medium comprising a magnetic recording film to which information is magnetically recorded; and a composite thin-film magnetic head comprising a recording magnetic head element and a reproducing magnetic head element arranged along a longitudinal direction of the composite thin-film magnetic head, the recording magnetic head element recording information to the magnetic recording medium by means of a recording current supplied to a coil provided in the recording magnetic head element, the recording magnetic head element comprising a first magnetic pole and a second magnetic pole which serves as a magnetic shield so that a magnetic flux passes therethrough when the recording current is supplied to the coil, the reproducing magnetic head element generating a reproducing signal according to a magnetic flux which is provided by the magnetic recording medium and guided by the second magnetic pole, the method comprising the steps of:

a) moving the composite thin-film magnetic head to a quasi recording information recording area provided on said magnetic recording medium when a read error has occurred in a reading operation of recorded data performed by the reproducing magnetic head element;

b) recording a quasi recording information to the quasi recording information area by the magnetic recording information so as to stabilize a magnetic state of the second magnetic pole, and thereafter supplying an erase current to the recording magnetic head element at a predetermined level for a predetermined period;

c) detecting the read error by reproducing the quasi recording information recorded on the magnetic recording medium by the reproducing magnetic head element; and d) resuming the reading operation of the recorded data when the read error is not detected in the step c), by returning the composite thin-film magnetic head to a position where the read error of the step a) has occurred.

According to the above-mentioned invention, a magnetized state of the reproducing magnetic head element can be corrected to a stable magnetized state when a read error has occurred, and thus a stable reproducing signal can be obtained. If the read error cannot be eliminated by repeating a predetermined number of quasi information recording operations, a notification can be given to an operator of a malfunctioning of the thin-film magnetic head.

Other objects, features and advantages of the present invention will become more apparent from the following description when read in conjunction with the accompanying drawings.

BRIEF DESCRIPTION OF THE DRAWINGS

FIG. 25 is a graph showing conditions of magnetization of the magnetic shield shown in FIG. 2B;

FIG. 26 is a graph showing a relationship between a stabilizing current and a fluctuation of a read signal output from an MR head;

FIG. 34 is an illustration showing results of experiments for investigating changes in an output of the reproducing magnetic head in the seventh embodiment; and FIG. 35 is an illustration showing probability of output increase for various dummy write periods.

DETAILED DESCRIPTION OF THE PREFERRED EMBODIMENTS

A description will now be given of a first embodiment of the present invention.

Figure 9:
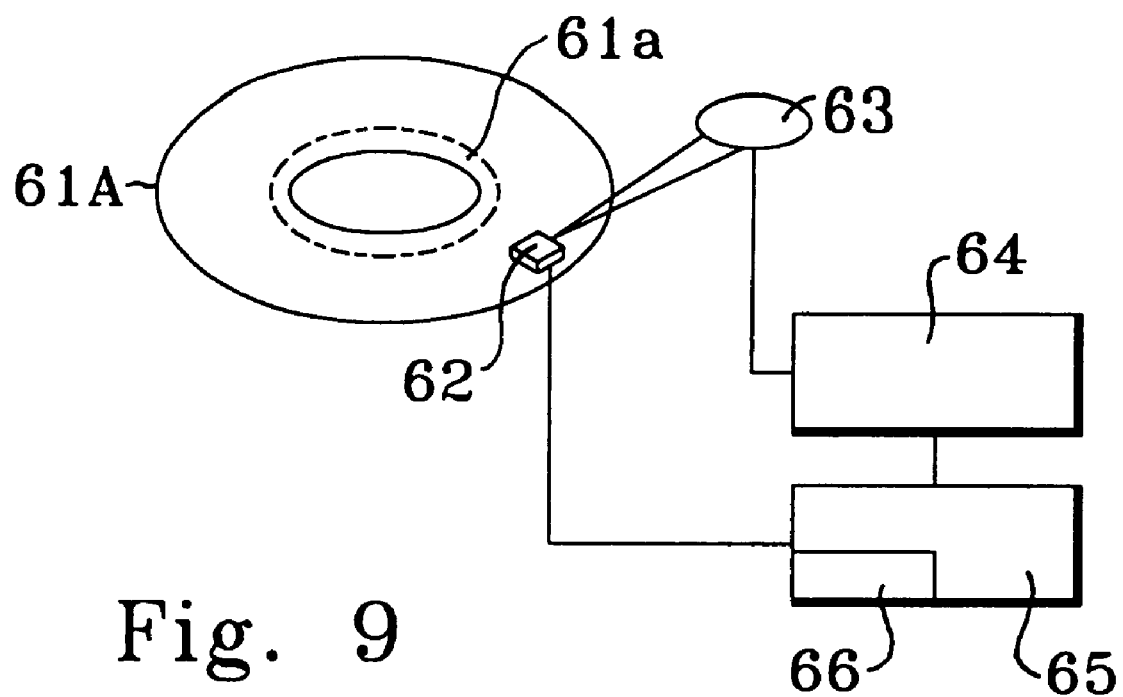
FIG. 9 is an illustration of a structure of a first embodiment of a magnetic disk apparatus according to the present invention.

FIG. 9 is an illustration of a structure of the first embodiment of a magnetic disk apparatus according to the present invention. In FIG. 9, a magnetic disk 61A has a construction the same as that shown in FIG. 1. An inner guard band 61a is an area in which no information is recorded. Additionally, a ring-magnetic-pole induction type thin-film magnetic head 62 has a construction the same as that of the magnetic head shown in FIG. 1.

The first embodiment of the present invention further comprises a head positioning mechanism 63, a head positioning controlling circuit 64 and a recording/reproducing controlling circuit 65 having a current supplying circuit 66. The current supplying circuit 66 is provided for demagnetizing magnetic poles provided in the magnetic head 62.

The magnetic head 62 is supported by the head positioning mechanism 63 and is floated on the magnetic disk 61A while it is rotated. A positioning of the magnetic head 62 on the magnetic disk 61A is performed by the head positioning mechanism 63 in accordance with a control signal supplied by the head positioning controlling circuit 64.

Figure 10:
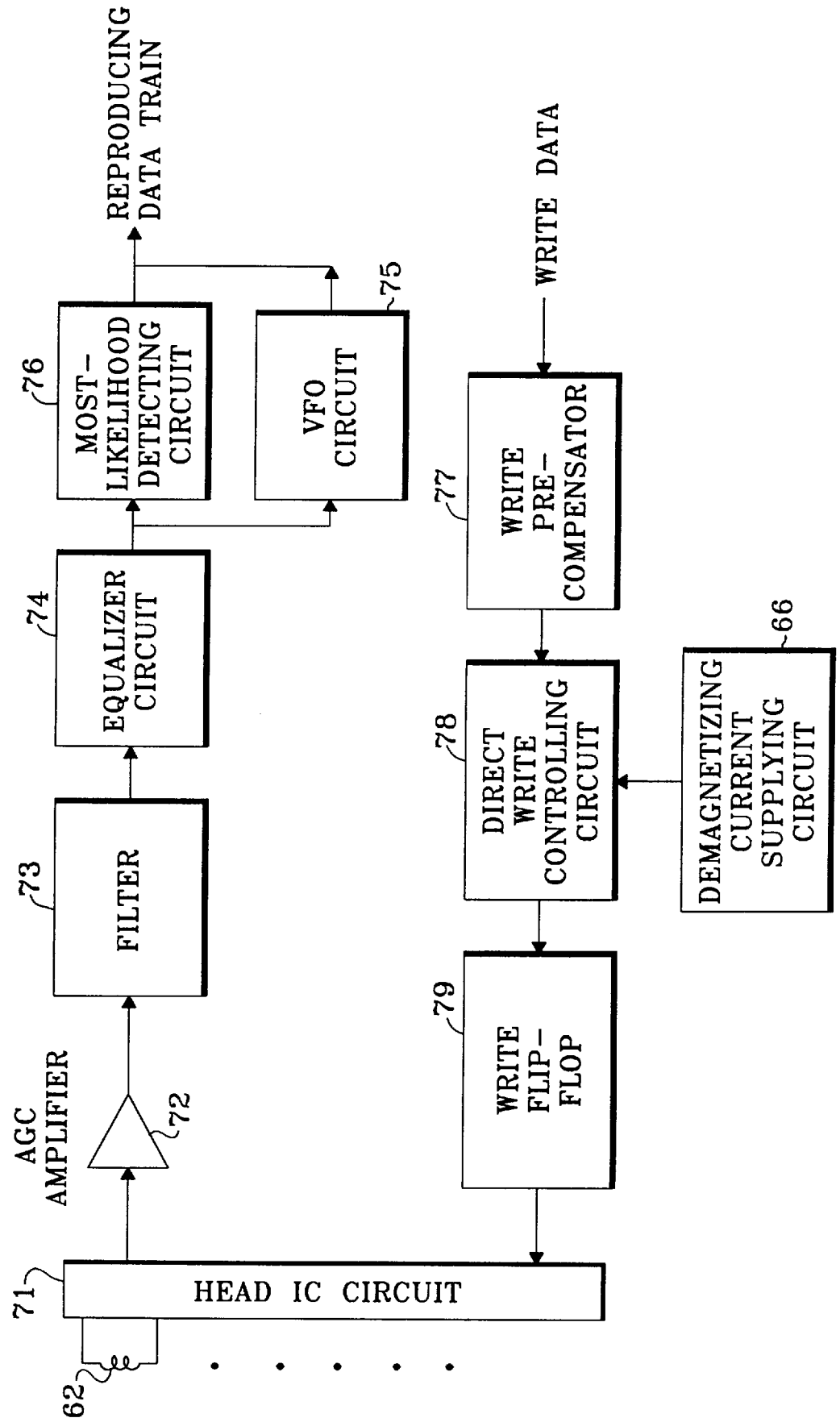
FIG. 10 is a block diagram of a recording/reproducing controlling circuit shown in FIG. 9.

FIG. 10 is a block diagram of the recording/reproducing controlling circuit shown in FIG. 9. The magnetic head 62 shown in FIG. 9 is connected to and controlled by a head IC circuit 71. In a reproducing system in FIG. 10, a read waveform output from the magnetic head 62 is supplied to an automatic gain control (AGC) amplifier 72 via the head IC circuit 71, and then supplied to a filter 73.

The AGC amplifier 72 performs an AGC control on the read waveform. The filter 73 cuts off a high frequency component of an output of the AGC amplifier 72. An output from the filter 73 is supplied to an equalizer circuit 74. The equalizer 74 equalizes the read waveform, and then sends the equalized waveform to a variable frequency oscillator (VFO) circuit 75 and a most-likelihood detecting circuit 76.

The VFO circuit 75 generates a synchronous clock signal according to the equalized waveform supplied by the equalizer circuit 74. The most-likelihood detecting circuit 75 decodes the equalized waveform to obtain a data train, and outputs the data train as a reproduced data train.

On the other hand, in a recording system, write data is compensated by a write pre-compensator 77, and then supplied to a direct write controlling circuit 78 so as to generate write pattern data. An electric current used for demagnetizing is supplied to the direct write controlling circuit 78 by a demagnetizing current supplying circuit 66 for a predetermined period after sending the write pattern data.

The write pattern data is supplied via a write flip-flop 79 and the head IC circuit 71 to a selected magnetic head 62 so as to perform a recording operation on the magnetic disk 61A.

Figure 11:
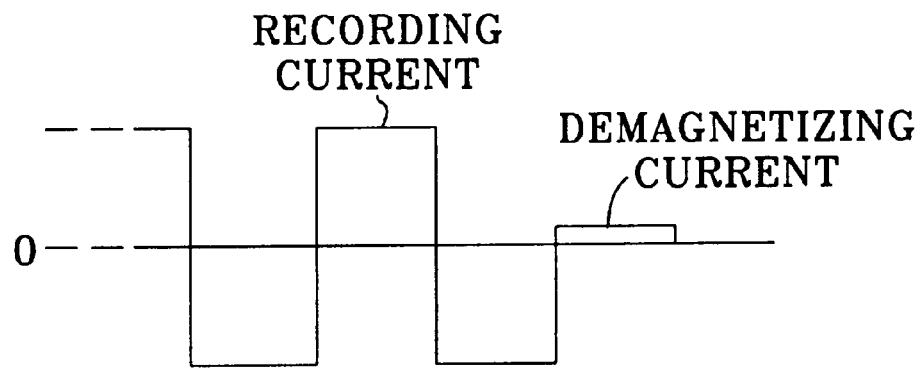
FIG. 11 is an illustration for explaining a current supply timing for demagnetization.

FIG. 11 is an illustration for explaining a current supply timing for demagnetization. A residual magnetization remaining at ends of the magnetic poles 23 and 26 can be eliminated by supplying a demagnetizing current to the coil 25 of the magnetic head 62 after a recording operation is completed. The demagnetizing current is supplied by the demagnetizing current supplying circuit 66 provided in the recording/reproducing circuit 65. The demagnetizing current is supplied so as to flow in a direction opposite to a direction in which the last recording current flowed in the coil 25.

Figure 12A:
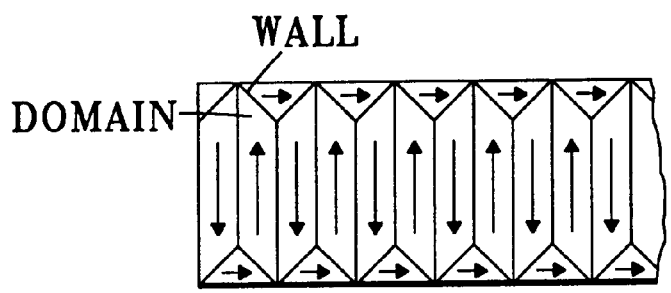
FIGS. 12A and 12B are illustrations for explaining domain constructions of an end of a magnetic pole provided in the magnetic head shown in FIG. 9.
Figure 12B:
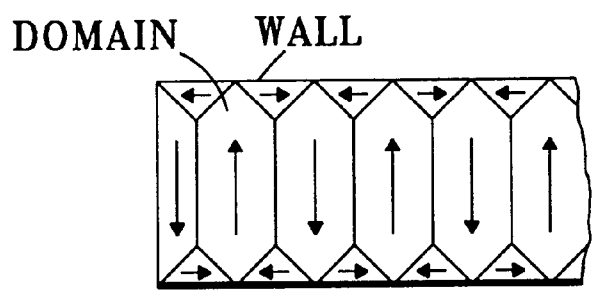

FIGS. 12A and 12B are illustrations for explaining domain constructions of an end of the magnetic pole 26. FIG. 12A shows a domain construction after supplying the recording current, and FIG. 12B shows a domain construction after supplying the demagnetizing current.

As shown in FIG. 12A, a domain of the end of the magnetic pole 26 immediately after the recording current has been supplied to the coil 25 does not have a hexagonal shape due to the residual magnetization. However, as shown in FIG. 12B, the shape of the domain becomes the hexagonal shape immediately after the demagnetizing current has been supplied to the coil 25 because the residual magnetization is erased. A domain construction having a hexagonal shaped domain is stable because of its circulating domain construction.

Accordingly, in the present embodiment, an occurrence of an error in a reproducing signal caused by a deformation of a reproducing signal waveform can be prevented since there is no residual magnetization remaining in the magnetic poles in a reproduction process.

A value of the demagnetizing current is, for example, 10 $\mu A$ and its supplying time is about 1 $\mu sec$. The demagnetizing current of about 10 $\mu A$ corresponds to approximately one half of a coercive force (Hc) of a soft magnetic film comprising the magnetic poles 23 and 26. The above-mentioned value of the demagnetizing current is dependent on a material and a magnetic property of the magnetic pole and a shape of an end of the magnetic pole. If the demagnetizing current exceeds a predetermined value, a residual magnetization is generated again. On the other hand, if the magnetizing current is less than the predetermined value, demagnetization is not sufficient to completely erase the residual magnetization.

In the present embodiment, a magnetic field at the ends of the magnetic poles 23 and 26 generated by the demagnetizing current is a few Gausses of which effect on the magnetic disk 11 having a value of coercive force of more than one thousand Oersted is negligible. However, in order to completely eliminate an undesired effect of a magnetic field generated by the demagnetizing current on the magnetic disk 61A, the magnetic head 62 may be moved to a non-recording area 61a, such as a contact start-stop (CSS) zone or a gap area, of the magnetic disk 61A when the demagnetizing current is supplied to the coil 25 of the magnetic head 62.

Figure 13:
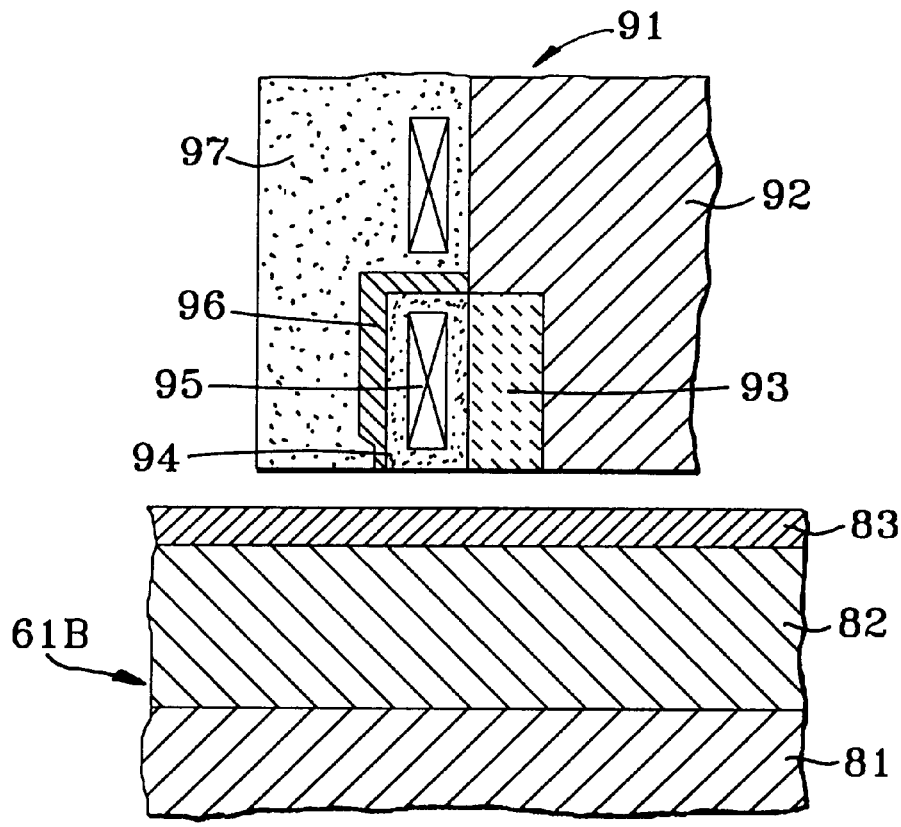
FIG. 13 is a cross sectional view of an essential part of a second embodiment of a magnetic disk apparatus according to the present invention.
Figure 14:
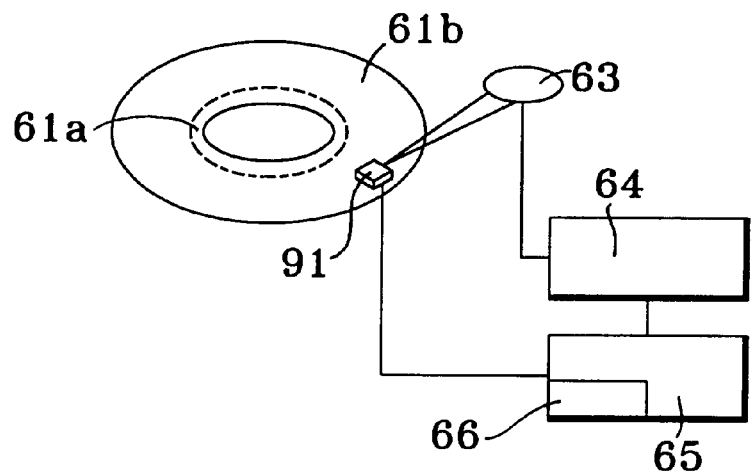
FIG. 14 is an illustration of a structure of the second embodiment of a magnetic disk apparatus according to the present invention.

FIG. 13 is a cross-sectional view of an essential part of a second embodiment of a magnetic disk apparatus according to the present invention. FIG. 14 is an illustration of a structure of the second embodiment of a magnetic disk apparatus according to the present invention.

In this embodiment, a magnetic disk 61B comprises, as shown in FIG. 13, a non-magnetic substrate 81, a backing layer 82 formed on the substrate 81 and a vertical magnetic recording layer 83 formed on the backing layer 82. The substrate 81 is made of an aluminum plate having a surface processed by means of NiP plating. The backing layer 82 is formed of a NiFe film. The vertical magnetic recording film 83 is made, of a CoCr film, and has a magnetic anisotropy in a direction perpendicular to a surface of the magnetic disk 61B.

A vertical thin-film magnetic head 91 comprises a ferrite substrate 92, a non-magnetic member 93 formed in the ferrite substrate 92, a coil 95 surrounded by an insulating layer 94, a main magnetic pole 96 and a protective layer 97. The ferrite substrate acts as a return yoke. The non-magnetic member 93 made of glass is formed near a position in which the coil 95 is formed. The main magnetic pole 96 is made of a NiFe film, and one end thereof faces the magnetic disk 61B and the other end is connected to the ferrite substrate 92. The protective layer 97 is made of an $Al_2O_3$ film.

As shown in FIG. 14, the second embodiment according to the present invention is a magnetic disk apparatus comprising the vertical magnetic recording disk 61B and the vertical thin-film magnetic head 91. Other parts are the same as the parts shown in FIG. 9.

The magnetic head 91 is supported by the head positioning mechanism 63 and is floated on the magnetic disk 61B while it is rotated. A positioning of the magnetic head 91 on the magnetic disk 61B is performed by the head positioning mechanism 63 in accordance with a control signal supplied by the head positioning controlling circuit 64.

Similarly to the above-mentioned first embodiment, a residual magnetization remaining at the end of the main magnetic pole 96 can be eliminated by supplying a demagnetizing current to the coil 95 of the magnetic head 91 after a recording operation is completed. The demagnetizing current is supplied by the demagnetizing current supplying circuit 66 provided in the recording/reproducing circuit 65. The demagnetizing current is supplied so as to flow in a direction opposite to a flowing direction of the last recording current supplied to the coil 95.

Accordingly, in the present embodiment, an occurrence of an error in a reproducing signal caused by a deformation of a reproducing signal waveform can be prevented since there is no residual magnetization remaining in the magnetic poles in a reproduction process.

Figure 15:
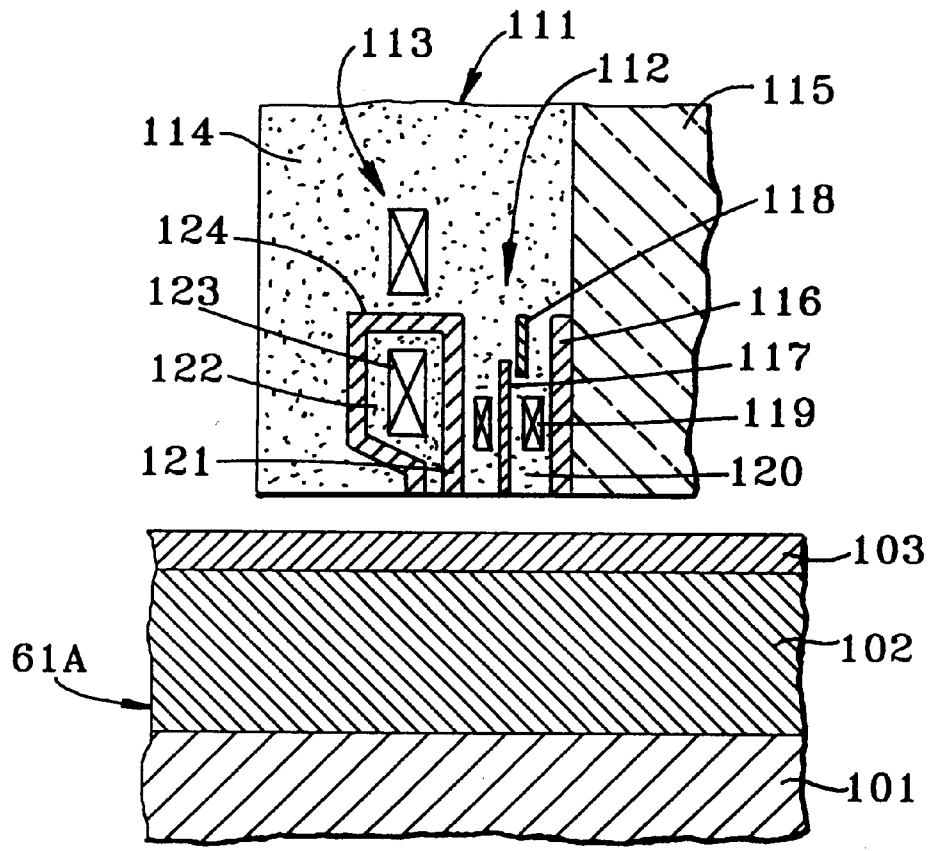
FIG. 15 is a cross sectional view of an essential part of a third embodiment of a magnetic disk apparatus according to the present invention.
Figure 16:
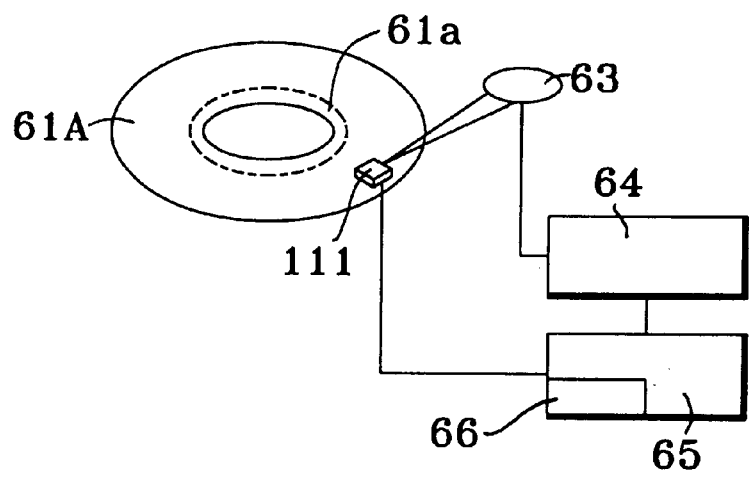
FIG. 16 is an illustration of a structure of the third embodiment of a magnetic disk apparatus according to the present invention.

FIG. 15 is a cross-sectional view of an essential part of a third embodiment of a magnetic disk apparatus according to the present invention. FIG. 16 is an illustration of a structure of the third embodiment of a magnetic disk apparatus according to the present invention. In FIG. 16, parts that are the same as the parts shown in FIG. 9 are given the same reference numerals.

Figure 1:
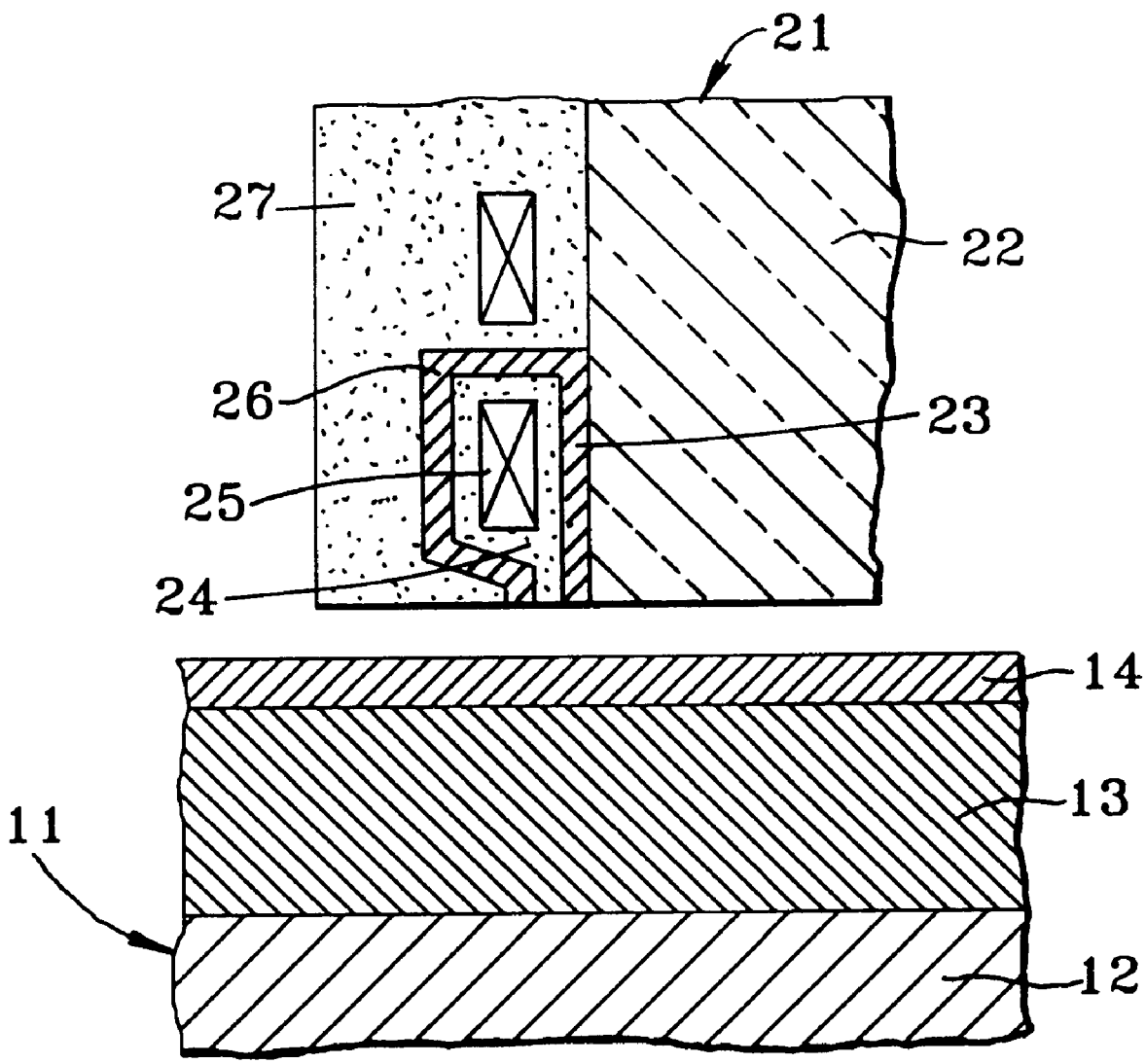
FIG. 1 is an illustration of an essential part of a conventional magnetic disk apparatus.

This embodiment is a magnetic disk apparatus comprising a magnetic disk 61A similar to that shown in FIG. 1 and a composite thin-film magnetic head 111. The magnetic head 111 comprises a ring-magnetic-pole inductive type thin-film magnetic head element 113 and a magnetoresistance (MR) type thin-film magnetic head element 112.

As shown in FIG. 15, the magnetic disk 61A comprises a non-magnetic substrate 101, a Cr film 102 formed on the substrate 101 and a magnetic recording film, 103 formed on the Cr film 102. The magnetic recording film 103 is made of a CoCr film, and has a magnetic anisotropy in a direction longitudinal to the surface of the magnetic disk 61A.

The MR head element 112, which is exclusively used for reproducing operation, comprises a non-magnetic substrate 115, a magnetic shield 116, a flux guide 117 and an MR element 118. The non-magnetic substrate 115 comprising $Al_2O_3$ acts as a slider. The magnetic shield 116 made of a NiFe alloy film is formed on the non-magnetic substrate 115. The flux guide 117 is made of NiFe alloy film. An end of the flux guide 117 faces the magnetic disk 61A, and the other end is connected to the MR element 118. Additionally, a demagnetizing coil 119 comprising a single-turn coil is provided around the flux guide 117. The MR head element 112 is embedded in an insulating film 114 made of $Al_2O_3$.

The magnetic head element 113, which is exclusively used for a recording operation, comprises a first magnetic pole 121, a coil 123 and a second magnetic pole 124. The first magnetic pole 121 and the second magnetic pole 124 are made of a NiFe film, and a intermediate insulating layer 122 is provided therebetween. An end of each of the first magnetic pole 121 and the second magnetic pole 124 faces the surface of the magnetic disk 61A. The other end of each of the first magnetic pole 23 and the second magnetic pole 26 is connected to each other so that a magnetic flux path, is formed. The first magnetic pole 121, the second magnetic pole 124 and the coil 123 are embedded in the insulating film 114.

As shown in FIG. 16, similarly to the above-mentioned first and second embodiments, the third embodiment of the present invention comprises the head positioning mechanism 63, the head-positioning controlling circuit 64 and the recording/reproducing controlling circuit 65 having a current supplying circuit 66. The current supplying circuit 66 is provided for demagnetizing the flux guide provided in the magnetic head 111.

The magnetic head 111 is supported by the head positioning mechanism 63 and is floated on the magnetic disk 61A while it is rotated. A positioning of the magnetic head 111 on the magnetic disk 61A is performed by the head positioning mechanism 63 in accordance with a control signal supplied by the head-positioning controlling circuit 64.

Figure 17:
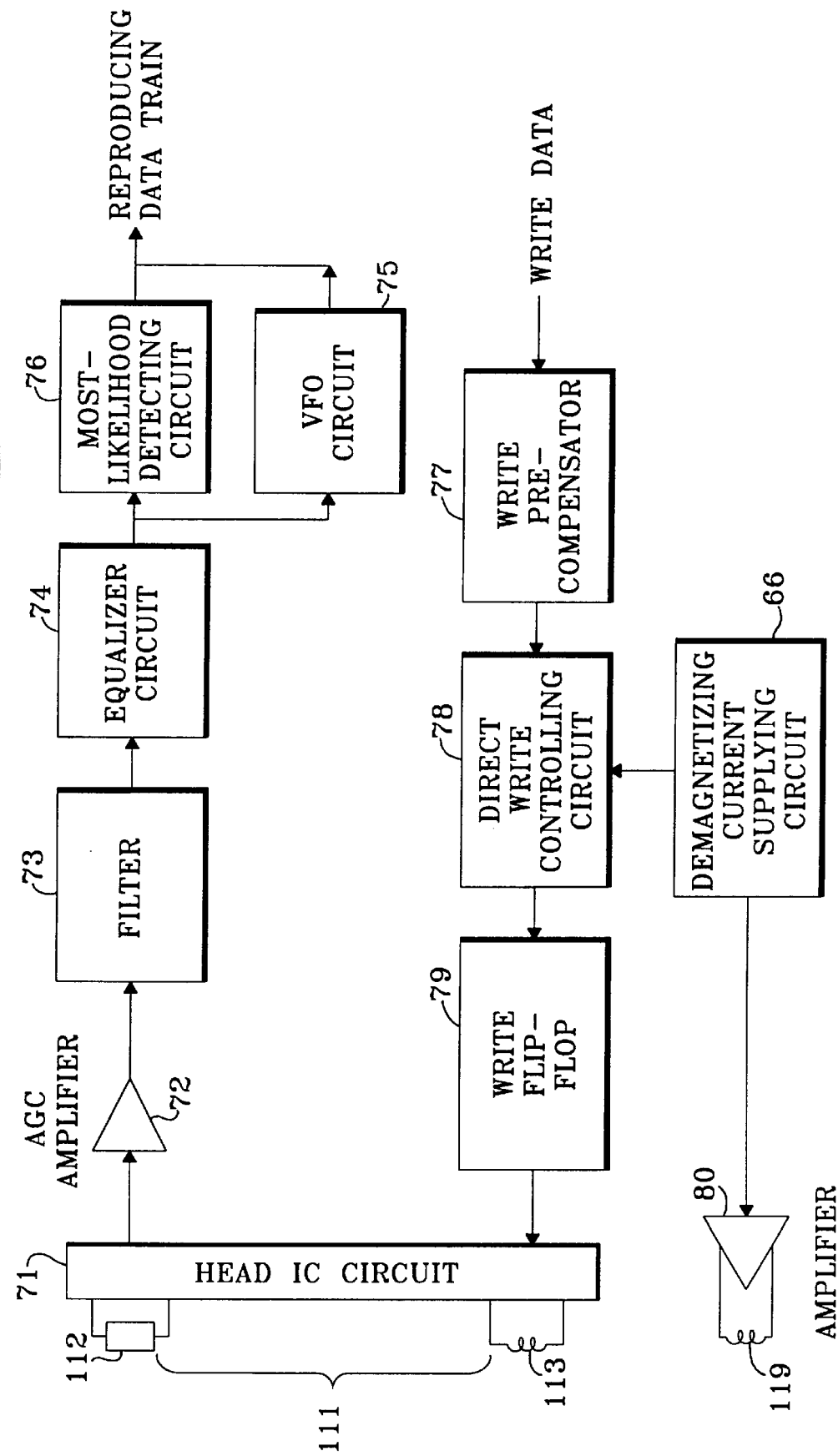
FIG. 17 is a block diagram of a recording/reproducing controlling circuit shown in FIG. 16.

FIG. 17 is a block diagram of the recording/reproducing controlling circuit 65 shown in FIG. 16. In FIG. 17, parts that are the same as the parts shown in FIG. 10 are given the same reference numerals, and descriptions thereof will be omitted.

In the recording/reproducing controlling circuit 65 of the present embodiment, the demagnetizing current supplying circuit 66 supplies the demagnetizing current to the coil 119 of the magnetic head 111 via an amplifier 80 immediately after a recording operation is completed.

Figure 18:
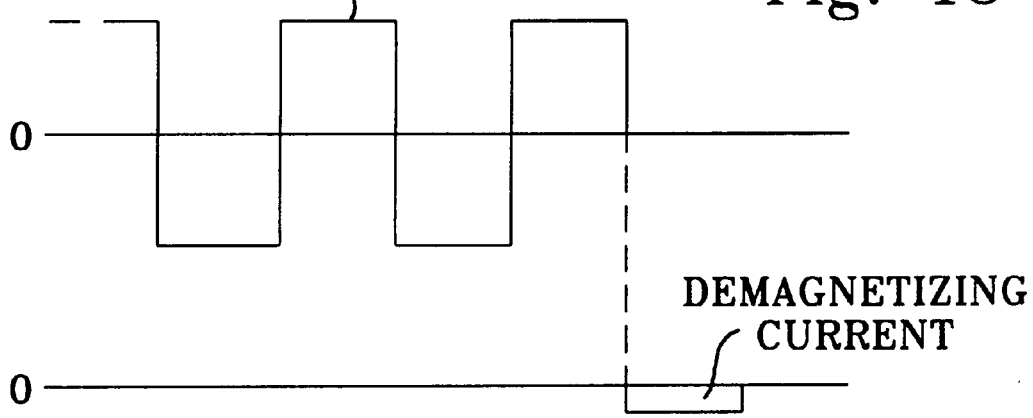
FIG. 18 is an illustration for explaining a current supply timing for demagnetization.

FIG. 18 is an illustration for explaining a current supply timing for demagnetization. A residual magnetization remaining at the end of the flux guide 117 can be eliminated by supplying a demagnetizing current to the demagnetizing coil 119 of the MR head element 112 after a recording operation performed by the magnetic head element 113 is completed. The demagnetizing current is supplied by the demagnetizing current supplying circuit 66 provided in the recording/reproducing circuit 65. The demagnetizing current is supplied so as to flow in a direction opposite to a flowing direction of the last recording current supplied to the coil 123 of the magnetic head element 113. A value of the demagnetizing current is, for example, 0.3 mA and its supplying time is about 1 μsec. The demagnetizing current of about 0.3 mA corresponds to approximately one half of a coercive force (Hc) of the soft magnetic film comprising the flux guide 117.

Accordingly, similarly to the above-mentioned first and second embodiments, an occurrence of an error in a reproducing signal caused by a deformation of a reproducing signal waveform can be prevented since there is no residual magnetization remaining in the flux guide in a reproduction process.

Figure 19:
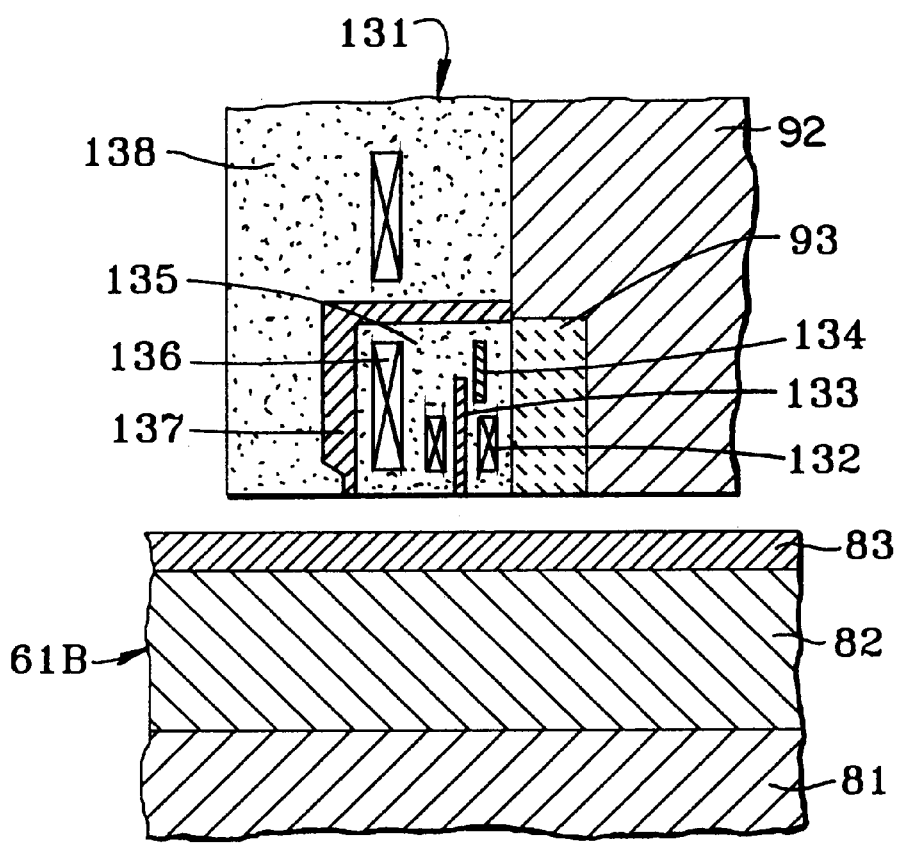
FIG. 19 is a cross sectional view of an essential part of a fourth embodiment of a magnetic disk apparatus according to the present invention.

FIG. 19 is a cross-sectional view of an essential part of a fourth embodiment of a magnetic disk apparatus according to the present invention. This embodiment comprises the vertical magnetic recording type magnetic disk 61B shown in FIG. 13 and a magnetic head 131 comprising a single magnetic-pole type vertical magnetic head element and an MR head element.

In this embodiment, a magnetic disk 61B comprises, as described with reference to FIG. 13, the non-magnetic substrate 81, the backing layer 82 formed on the substrate 81 and the vertical magnetic recording layer 83 formed on the backing layer 82. The vertical magnetic recording film 83 is made of a CoCr film, and has a magnetic anisotropy in a direction perpendicular to a surface of the magnetic disk 61B.

The magnetic head 131 comprises the ferrite substrate 92, the non-magnetic member 93 formed in the ferrite substrate 92, a recording coil 136, a main magnetic pole 137 and a protective layer 138. The ferrite substrate 92 acts as a return yoke. The non-magnetic member 93 made of glass is formed near a position in which the recording coil 136 is formed. The main magnetic pole 137 is made of a NiFe film, and one end thereof faces the magnetic disk 61B and the other end is connected to the ferrite substrate 92. The protective layer 138 is made of an $Al_2O_3$ film.

Additionally, a flux guide 133 is provided between the non-magnetic member 93 and the recording coil 130. The flux guide 133 is made of NiFe alloy film. An end of the flux guide 133 faces the magnetic disk 61B, and the other end is connected to an MR element 134. Additionally, a demagnetizing coil 132 comprising a single-turn coil is provided around the flux guide 133. The flux guide 133, the demagnetizing coil 132 and the MR element 134 are embedded in an intermediate insulating film 135 made of an $Al_2O_3$ film.

Similarly to the above-mentioned third embodiment described with reference to FIG. 16, the magnetic head 131 is supported by a head positioning mechanism 63 and is floated on the magnetic disk 61B while it is rotated. A positioning of the magnetic head 131 on the magnetic disk 61B is performed by the head positioning mechanism 63 in accordance with a control signal supplied by the head positioning controlling circuit 64.

In this embodiment, a residual magnetization remaining at the end of the flux guide 133 can be eliminated by supplying a demagnetizing current-to the demagnetizing coil 132 after a recording operation performed by the main magnetic pole 137 and the recording coil 136 is completed. The demagnetizing current is supplied for a predetermined period by the demagnetizing current supplying circuit 66 provided in the recording/reproducing circuit 65. The demagnetizing current is supplied so as to flow in a direction opposite to a flowing direction of the last recording current supplied to the recording coil 136. The demagnetizing current has a predetermined value which corresponds to approximately one half of a coercive force (Hc) of the soft magnetic film comprising the flux guide 133.

Accordingly, similarly to the above-mentioned third embodiment, an occurrence of an error in a reproducing signal caused by a deformation of a reproducing signal waveform can be prevented since there is no residual magnetization remaining in the end of of the flux guide 133 when starting a reproduction process.

Figure 20:
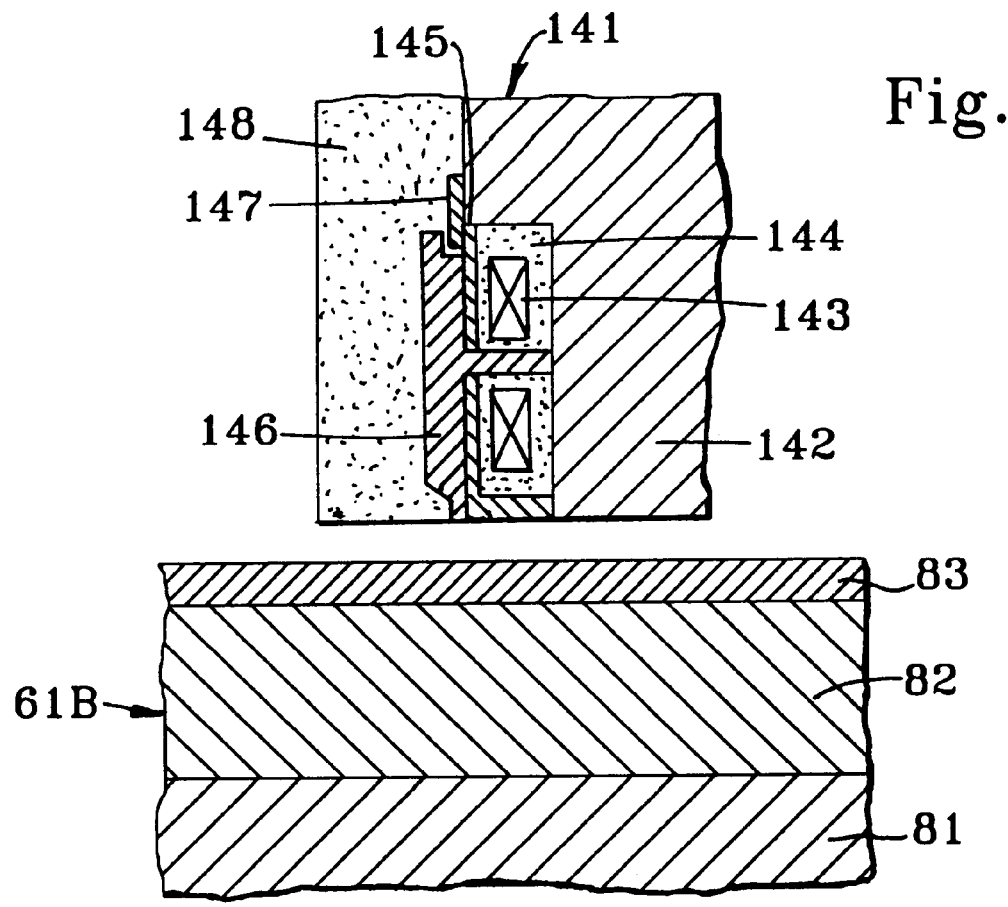
FIG. 20 is a cross sectional view of an essential part of a fifth embodiment of a magnetic disk apparatus according to the present invention.

FIG. 20 is a cross-sectional view of an essential part of a fifth embodiment of a magnetic disk apparatus according to the present invention. This embodiment comprises the vertical magnetic recording type magnetic disk 61B shown in FIG. 13 and a composite magnetic head 141.

The composite magnetic head 141 comprises a ferrite substrate 142, a coil 143, a main magnetic pole 146 and a MR element 147. The ferrite substrate 142 acts as a return yoke. The coil 143 is embedded in a portion of the ferrite substrate 142. The main magnetic pole 146 is provided over the coil 143, and a portion of the main magnetic pole 146 extends through the center of the coil 143 and reaches the ferrite substrate 142. The coil 143 is surrounded by a first insulating film 144 made of an $Al_2O_3$ film. A second insulating film 145 made of a diamond-like carbon film is provided between the first insulating film 144 and the main magnetic pole 146. An end of the magnetic pole 146 faces the magnetic disk 61B, and an opposite end thereof is connected to the MR element 147 via the second insulating film 145. Thus, the MR element 147 is magnetically connected to the main magnetic pole 146 via the second insulating film 145. The main magnetic pole 146 acts as the flux guide 133 of the fourth embodiment shown in FIG. 19.

Similarly to the above-mentioned second embodiment described with reference to FIG. 14, the magnetic head 141 is supported by a head positioning mechanism, and is floated on the magnetic disk 61B while it is rotated. A positioning of the magnetic head 141 on the magnetic disk 61B is performed by the head positioning mechanism in accordance with a control signal supplied by the head positioning controlling circuit.

In this embodiment, a residual magnetization remaining at the end of the main magnetic pole 146 can be eliminated by supplying a demagnetizing current to the coil 143 after a recording operation performed by the main magnetic pole 146 is completed. The demagnetizing current is supplied for a predetermined period by the demagnetizing current supplying circuit 66 provided in the recording/reproducing circuit 65. The demagnetizing current is supplied so as to flow in a direction opposite to a flowing direction of the last recording current supplied to the coil 143. The demagnetizing current has a predetermined value which corresponds to approximately one half of a coercive force (Hc) of the soft magnetic film comprising the main magnetic pole 146.

Accordingly, similarly to the above-mentioned fourth embodiment, an occurrence of an error in a reproducing signal caused by a deformation of a reproducing signal waveform can be prevented since there is no residual magnetization remaining at the end of the main magnetic pole 146 when starting a reproduction process.

It should be noted that, in the above-mentioned first to fifth embodiments, other films having the same function as that of NiFe, such as a CoZrNb film, may instead be used for the magnetic pole and the flux guide.

Additionally, in the above-mentioned third to fifth embodiments, a known biasing technique, such as a soft adjacent layer biasing method, a shunt biasing method, or an exchange biasing method using a diamagnetic film, may be used for functioning the MR element or stabilizing a domain of the MR element.

Additionally, as mentioned in the first to fifth embodiments, in order to completely eliminate the undesired effect of a magnetic field generated by the demagnetizing current on the magnetic disk, the magnetic head may be moved to a position on the magnetic disk where no recording is performed, such as an inner guard band, when the demagnetizing current is supplied to the coil or the demagnetizing coil.

Figure 21:
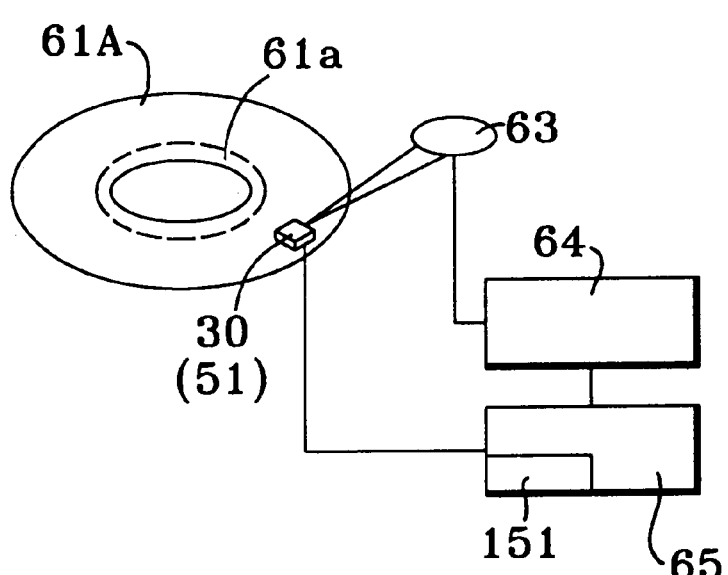
FIG. 21 is an illustration of a structure of a sixth embodiment of a magnetic disk apparatus according to the present invention.
Figure 22:
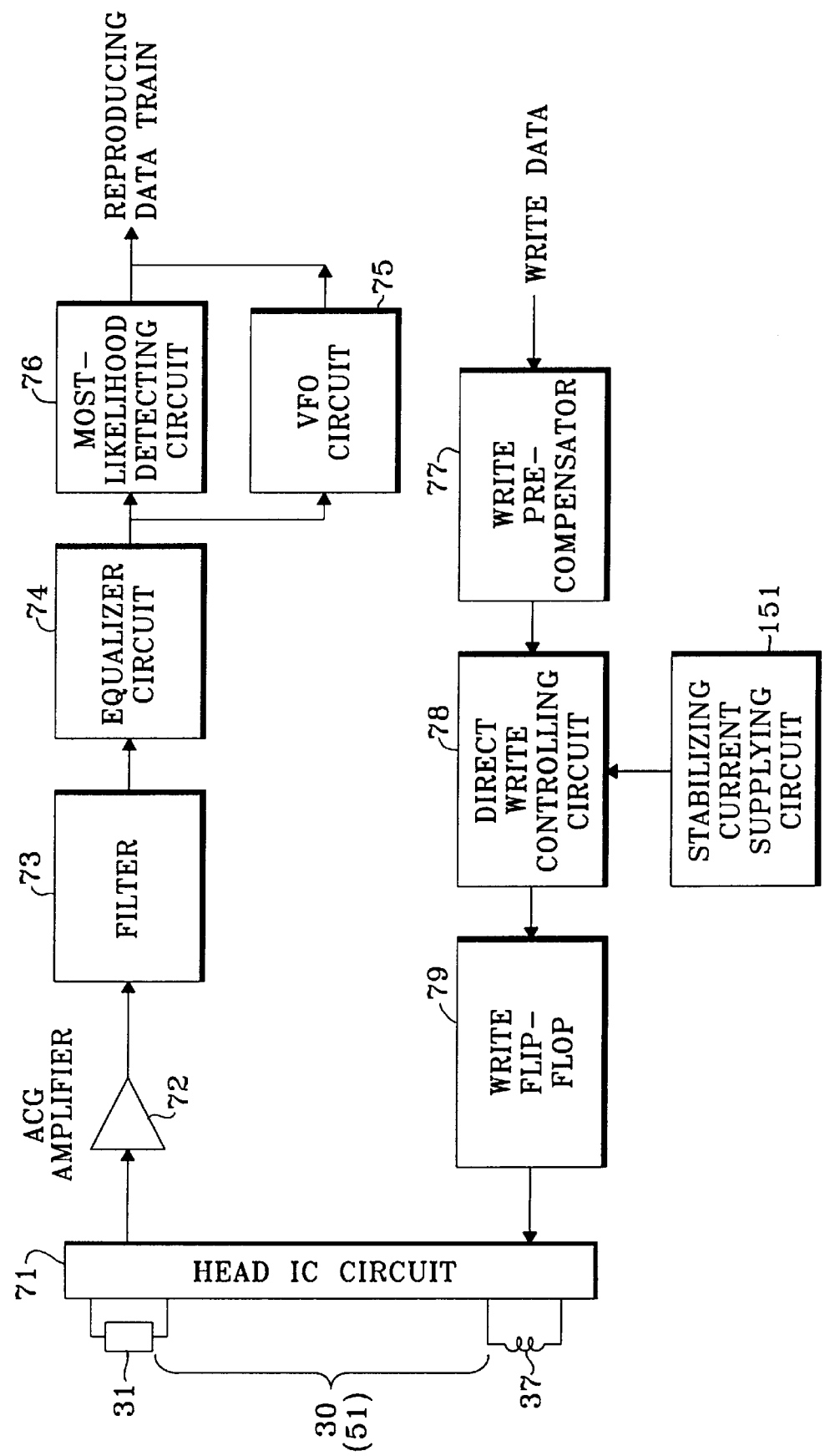
FIG. 22 is a block diagram of a recording/reproducing controlling circuit shown in FIG. 21.

FIG. 21 is an illustration of a structure of a sixth embodiment of a magnetic disk apparatus according to the present invention. FIG. 22 is a block diagram of the recording/reproducing controlling circuit shown in FIG. 21. In FIGS. 21 and 22, parts that are the same as the parts shown in FIGS. 9 and 10 are given the same reference numerals, and descriptions thereof will be omitted.

Figure 2A:
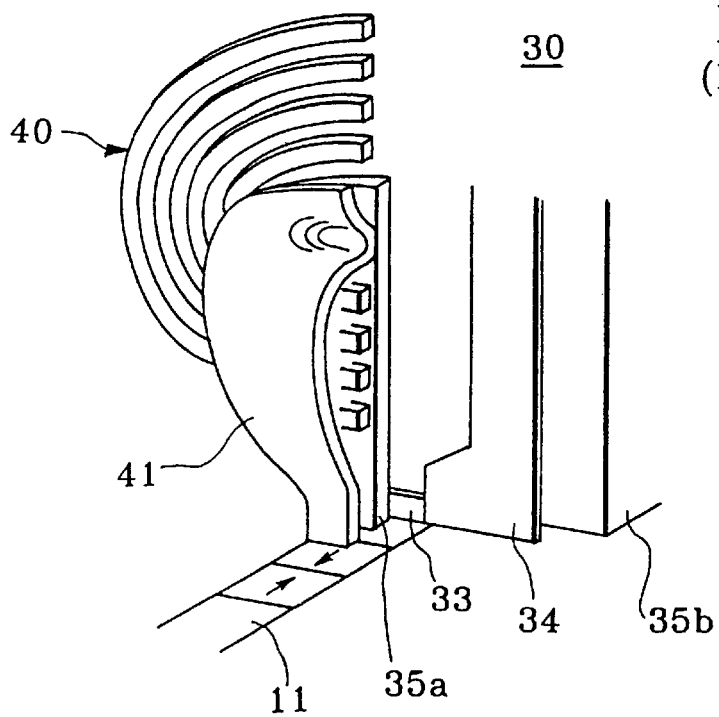
FIG. 2A is an illustration for explaining a conventional composite thin-film magnetic head.
Figure 2B:
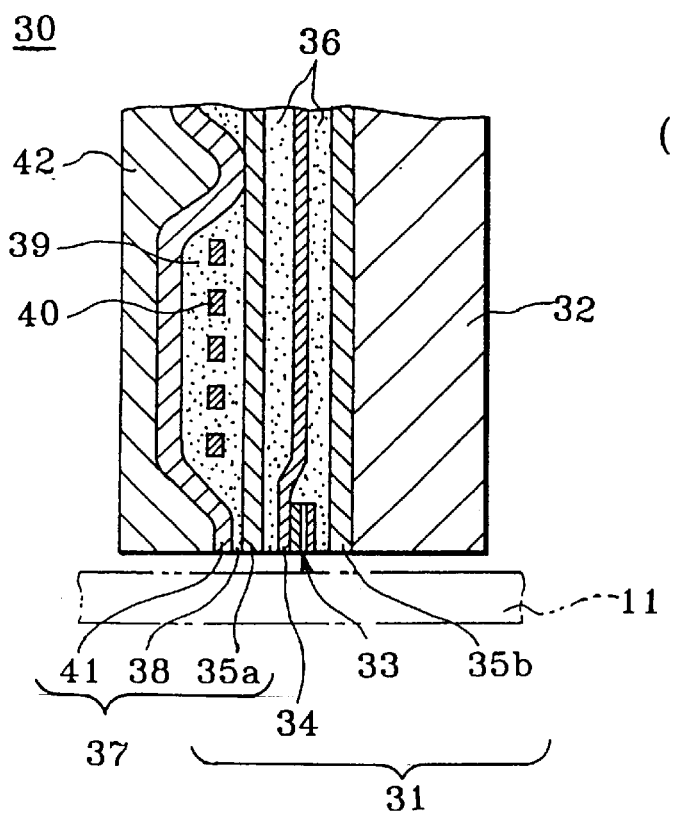
FIG. 2B is a partial cross sectional view of the magnetic head shown in FIG. 2A.
Figure 3:
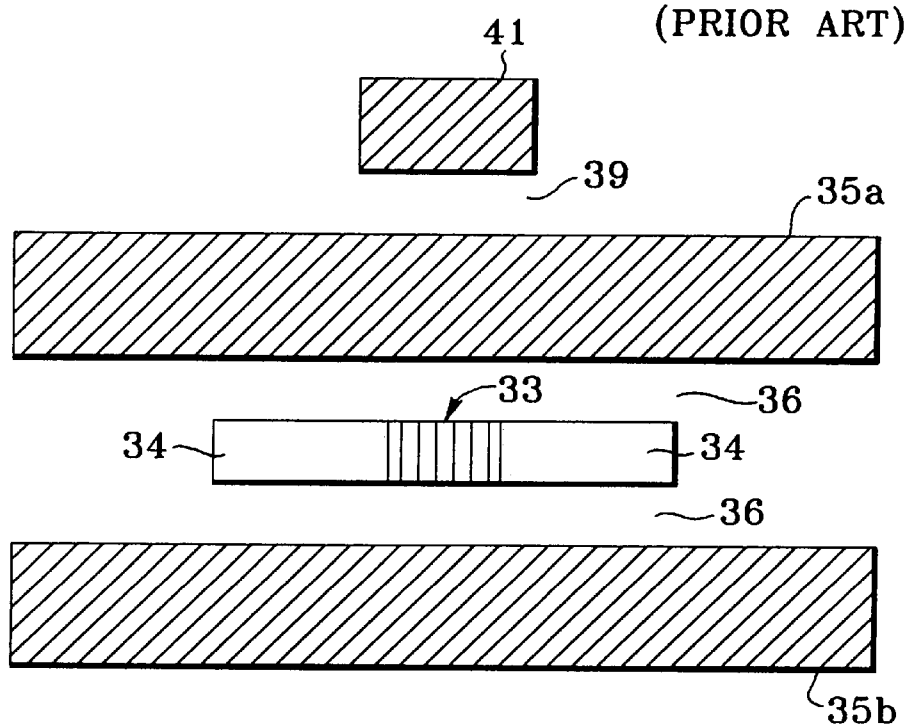
FIG. 3 is a bottom view of the magnetic head shown in FIG. 2A.
Figure 4:
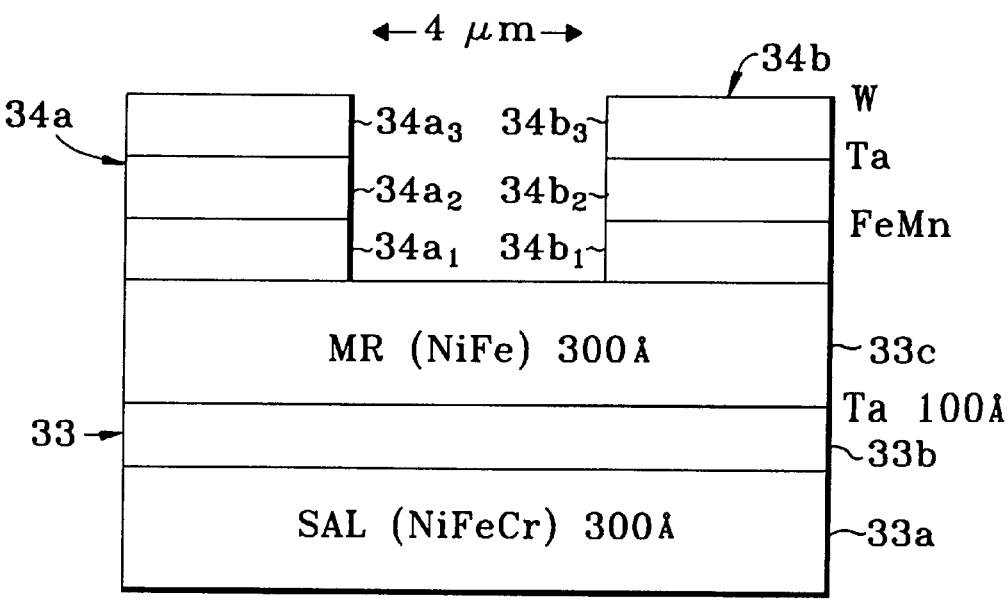
FIG. 4 is a cross sectional view of a conventional MR element and conductive layers.
Figure 5:
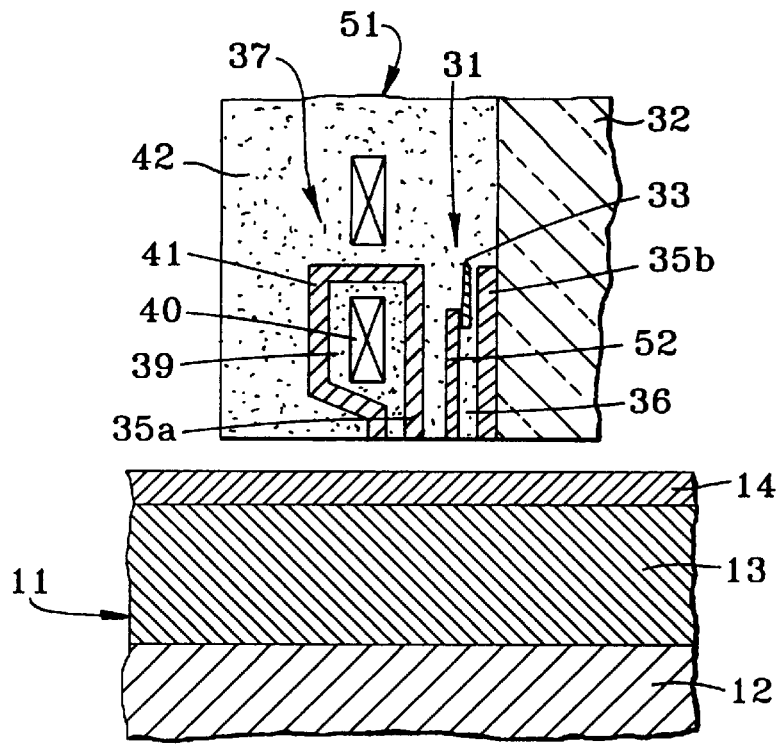
FIG. 5 is an illustration of an essential part of another conventional magnetic disk apparatus.
Figure 6A:
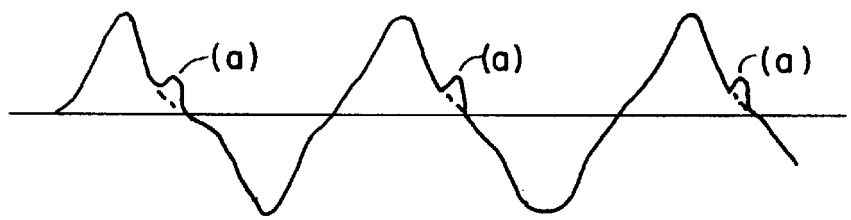
FIG. 6A is a reproducing signal waveform showing a wiggle noise.
Figure 6B:
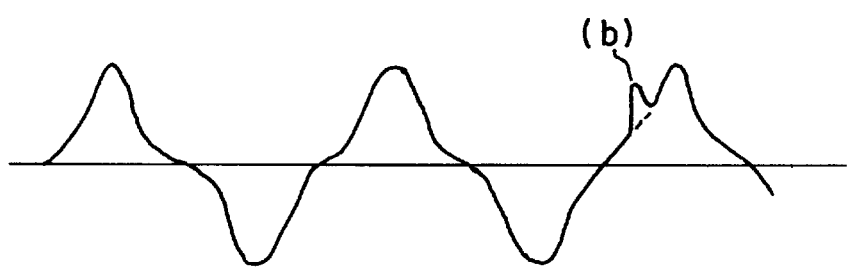
FIG. 6B is a reproducing signal waveform showing a popcorn noise.
Figure 7:
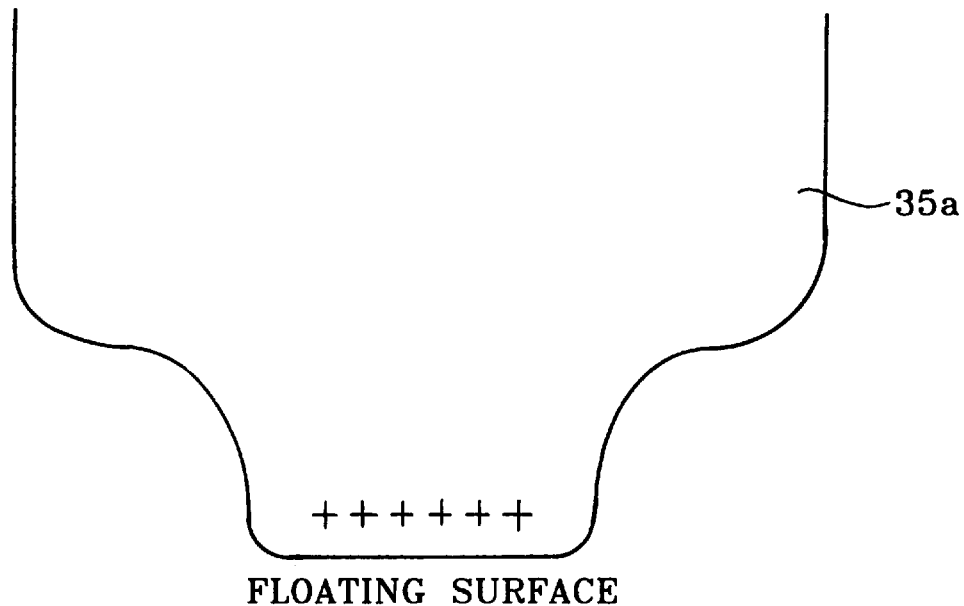
FIG. 7 is an illustration of a magnetic pole for explaining a residual magnetization.
Figure 8:
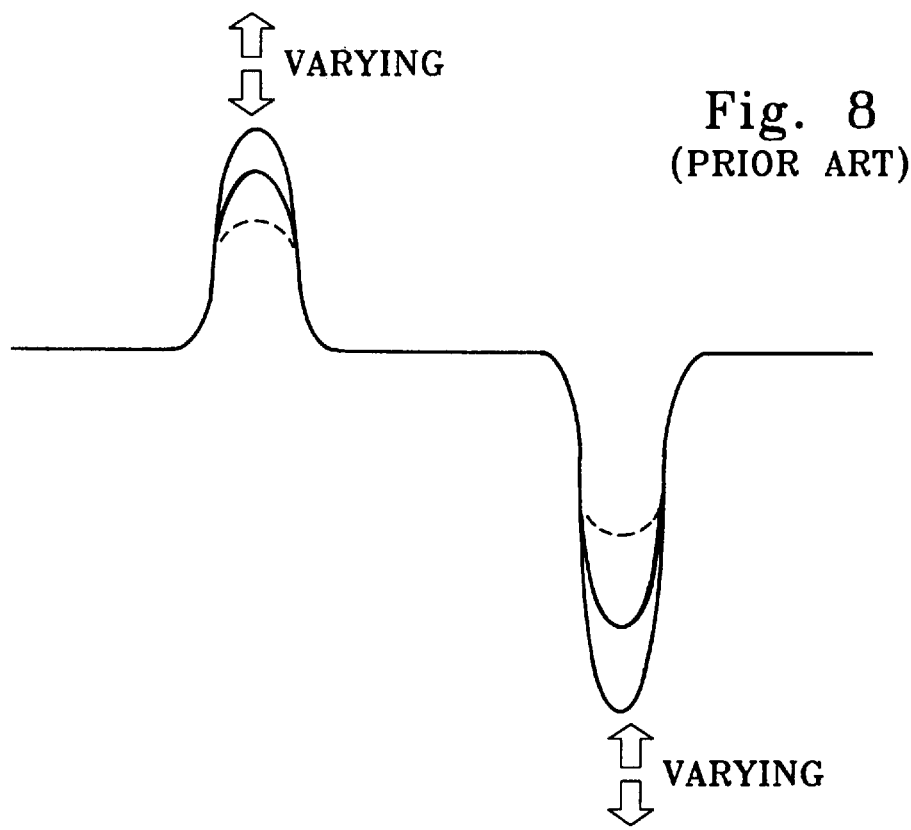
FIG. 8 is a waveform of a signal output from an MR head.

In this embodiment, the magnetic disk, which is a horizontal recording type shown in FIG. 9, and the composite thin-film magnetic head 30 (51) shown in FIG. 2B (FIG. 5) are used. As previously mentioned, the magnetic head 30 comprises the recording magnetic head 37 and the reproducing MR head 31.

As shown in FIG. 21, this embodiment features a stabilizing current supplying circuit 151 provided in the recording/reproducing controlling circuit 65. The stabilizing current supplying circuit 151 supplies a stabilizing current (described later) to the direct write controlling circuit 78.

Figure 23:
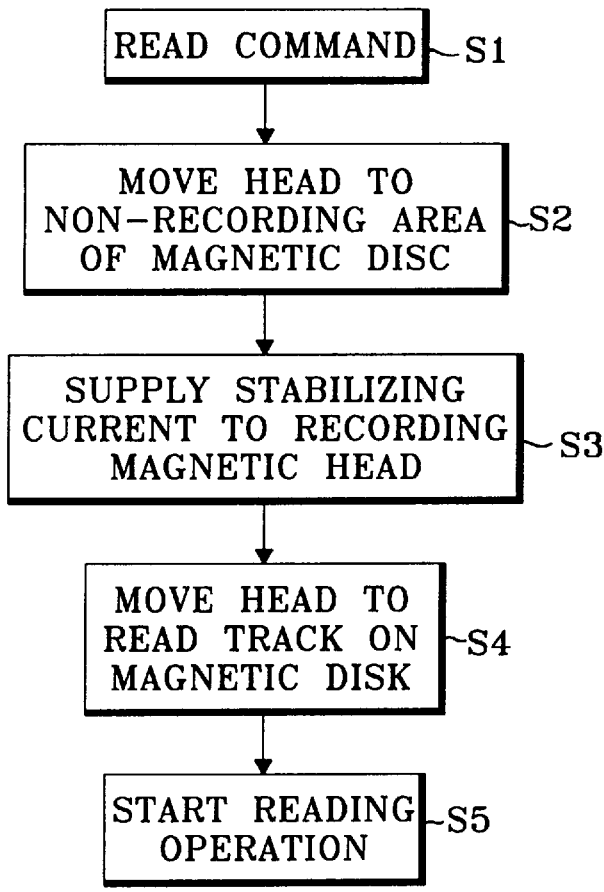
FIG. 23 is a flow chart of a stabilizing process of a reproducing operation.
Figure 24:
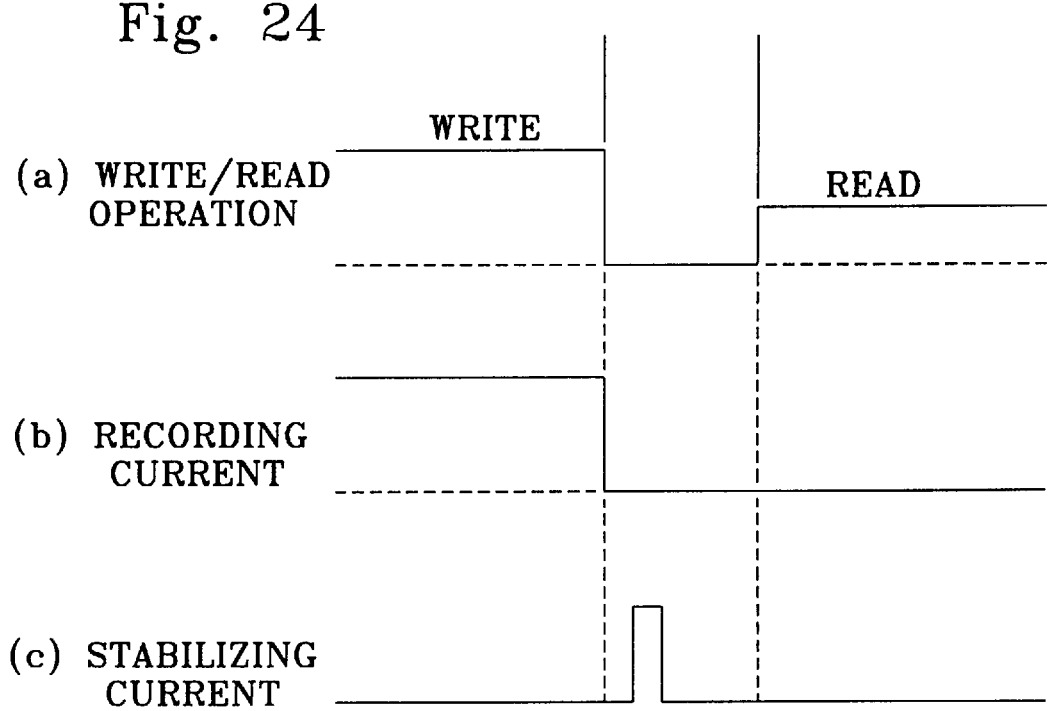
FIG. 24 is a timing chart of the stabilizing process shown in FIG. 23.

FIG. 23 is a flow chart of a stabilizing process of a reproducing operation. FIG. 24 is a timing chart of the stabilizing process.

When a read command is given in step 1 (hereinafter step is abbreviated as S), the magnetic head 30 is moved, in S2, to the non-recording area 61a of the magnetic disk 61A by means of the head positioning mechanism 63 and the head-positioning controlling circuit 64.

Thereafter, the stabilizing current, being 50 mA for example, is supplied, in S3, in a predetermined direction from the stabilizing current supplying circuit 151 to the recording magnetic head 37 of the magnetic head 30 (refer to FIG. 24-(c)). The stabilizing current is supplied for a predetermined period which is sufficient for changing a magnetized state of the first magnetic pole 35a of the magnetic head 30.

After the stabilizing current has been supplied, the magnetic head 30 is moved, in S4, to a read track of the magnetic disk 61A, and then a reading operation is started in S5.

FIG. 25 is a graph showing states of magnetization of the magnetic shield (first magnetic pole 35a) shown in FIG. 2B.

The magnetization of the magnetic shield generally has three stable states A, B and C as shown in FIG. 25. Among the three states, the state B in the center of the graph shown in FIG. 25 is the most stable state. In this state, there is no residual magnetization. States A and C are semi-stable conditions. Because the magnetization of the magnetic shield can have one of the states A, B and C according to a magnetic field applied to the magnetic shield, the magnetized state of the magnetic shield 35a (first magnetic pole) is not always in the same condition when a reproducing (reading) operation is started. Accordingly, a read waveform is varied due to the variation of the magnetized state of the first magnetic pole 35a.

In this embodiment, a magnetized state of the magnetic shield 35a is always at the same condition, either the state A or the state C, by supplying the stabilizing current to the recording magnetic head 37. Accordingly, magnetizing operation of the magnetic shield 35a can always be started from the same magnetized state.

In this embodiment, a residual magnetization of the magnetic shield 35a is not demagnetized but the magnetic shield 35a is magnetized always in the same state, and thereby deformation or asymmetry of the read waveform can be eliminated to reduce occurrence of reading errors.

FIG. 26 is a graph showing a relationship between the stabilizing current and fluctuation of read signal output from the MR head 31. In the graph of FIG. 26, a fluctuation rate and an asymmetric fluctuation rate of the read signal corresponding to various conditions of the stabilizing current are shown. In one condition, the stabilizing current of 40 mA is supplied in opposite directions. In another condition, the stabilizing current of 40 mA is supplied in a single direction. In a further condition, the stabilizing current of 50 mA is supplied in a single direction.

Apparent from the graph of FIG. 26, each fluctuation rate, when the stabilizing current of 40 or 50 mA is supplied in a single direction, is less than that when the stabilizing current of 40 mA is supplied in opposite directions. In this case, since the write (recording) current is generally 40 mA, each fluctuation rate can be decreased by a current equal to or greater than the generally used write current lasting for less than a few micro seconds.

It should be noted that the stabilizing current may be supplied immediately after a writing operation performed by the recording magnetic head 31 is completed or immediately before a reading operation performed by the MR head 31 will be performed.

This embodiment can be applied to the combination of the magnetic head and the magnetic disk described in the fifth embodiment according to the present invention.

Figure 27:
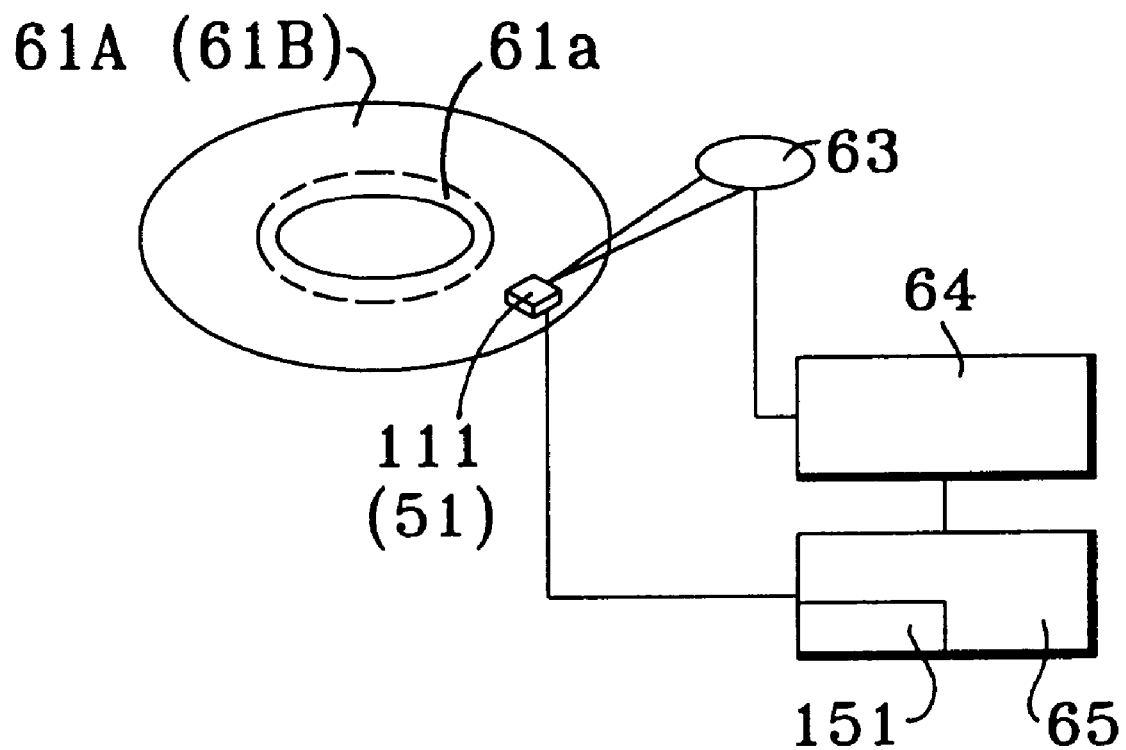
FIG. 27 is an illustration of a structure of a variation of the sixth embodiment shown in FIG. 21.
Figure 28:
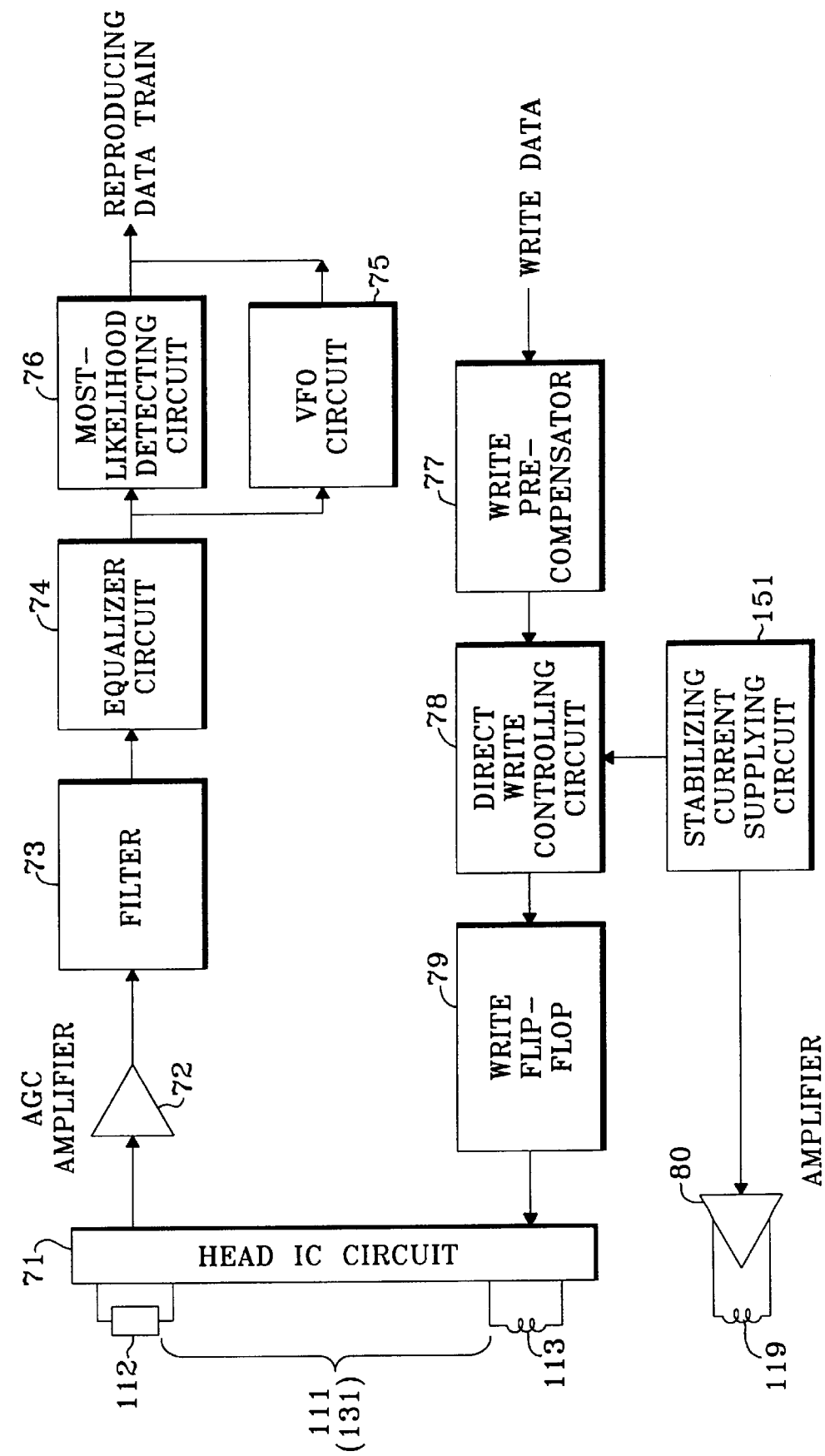
FIG. 28 is a block diagram of the recording/reproducing controlling circuit shown in FIG. 27.

FIG. 27 is an illustration of a structure of a variation of the sixth embodiment shown in FIG. 21. FIG. 28 is a block diagram of the recording/reproducing controlling circuit shown in FIG. 27. In this variation, the composite thin-film magnetic head 111 or 113 used in the above-mentioned third or fourth embodiment is used instead of the magnetic head 30 of the sixth embodiment. The stabilizing current is supplied from the stabilizing current supplying circuit 151 to the demagnetizing coil 119 provided around the flux guide 117 or 133 via the amplifier 80.

In this variation, a residual magnetization of the flux guide 117 or 133 is always magnetized in the same state, and thereby deformation or asymmetry of the read waveform can be eliminated to reduce occurrence of reading errors.

It should be noted that, in the sixth embodiment and the variation thereof, the magnetic head may be moved in a direction away from the surface of the magnetic disk, when the stabilizing current is supplied by the stabilizing current supplying circuit 151, so that an undesired effect caused by the stabilizing current on a recording area of the magnetic disk is prevented.

Figure 29:
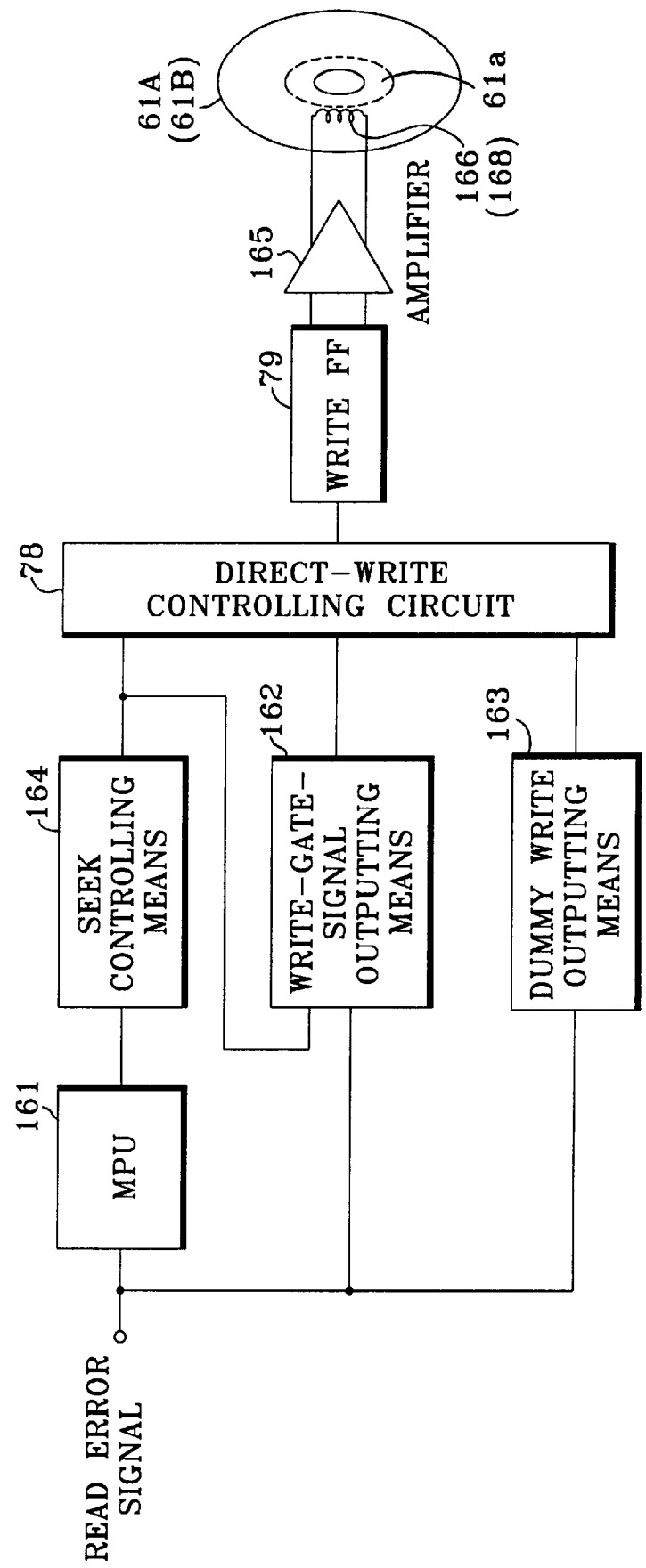
FIG. 29 is a block diagram of an erase controller of a seventh embodiment of a magnetic disk apparatus according to the present invention.

FIG. 29 is a block diagram of an erase controller of a seventh embodiment of a magnetic disk apparatus according to the present invention. In the seventh embodiment, either of vertical recording magnetic disk and horizontal recording magnetic disk may be used, and a composite thin-film magnetic head comprising a thin-film inductive type recording magnetic head element and a reproducing MR head element having an MR element is used. The reproducing MR head element may include a flux guide to which the MR head is connected.

In FIG. 29, a read error signal generate during a reproducing operation is sent to a microprocessor (MPU) 161, write-gate outputting means 162 and dummy-write-data outputting means 163 which corresponds to quasi recording-information outputting means.

The MPU 161 sends a command to seek controlling means 164, the command representing the magnetic head to be moved to a dummy-data recording area which is a recordable area but recording data is not to be recorded. This area may be the inner guard band 61a or an outer guard band of the magnetic disk 61A.

The seek controlling means 164 sends an on-track signal to a direct write controlling circuit 78 and the write-gate-signal outputting means 162, the on-track signal representing the magnetic head being positioned in the dummy-data recording area.

Additionally, a write gate signal is supplied from the write-gate-signal outputting means 162 to the direct-write controlling circuit 78, and dummy write data is sent from the dummy-write-data outputting means 163 to the direct-write controlling circuit 78.

After receiving the on-track signal, the direct-write controlling circuit 78 supplies a write current to a recording magnetic head 166 of a composite thin-film magnetic head 168 via a write flip-flop (write FF) 79 and an amplifier 165 provided in a head IC circuit.

Figure 30A:
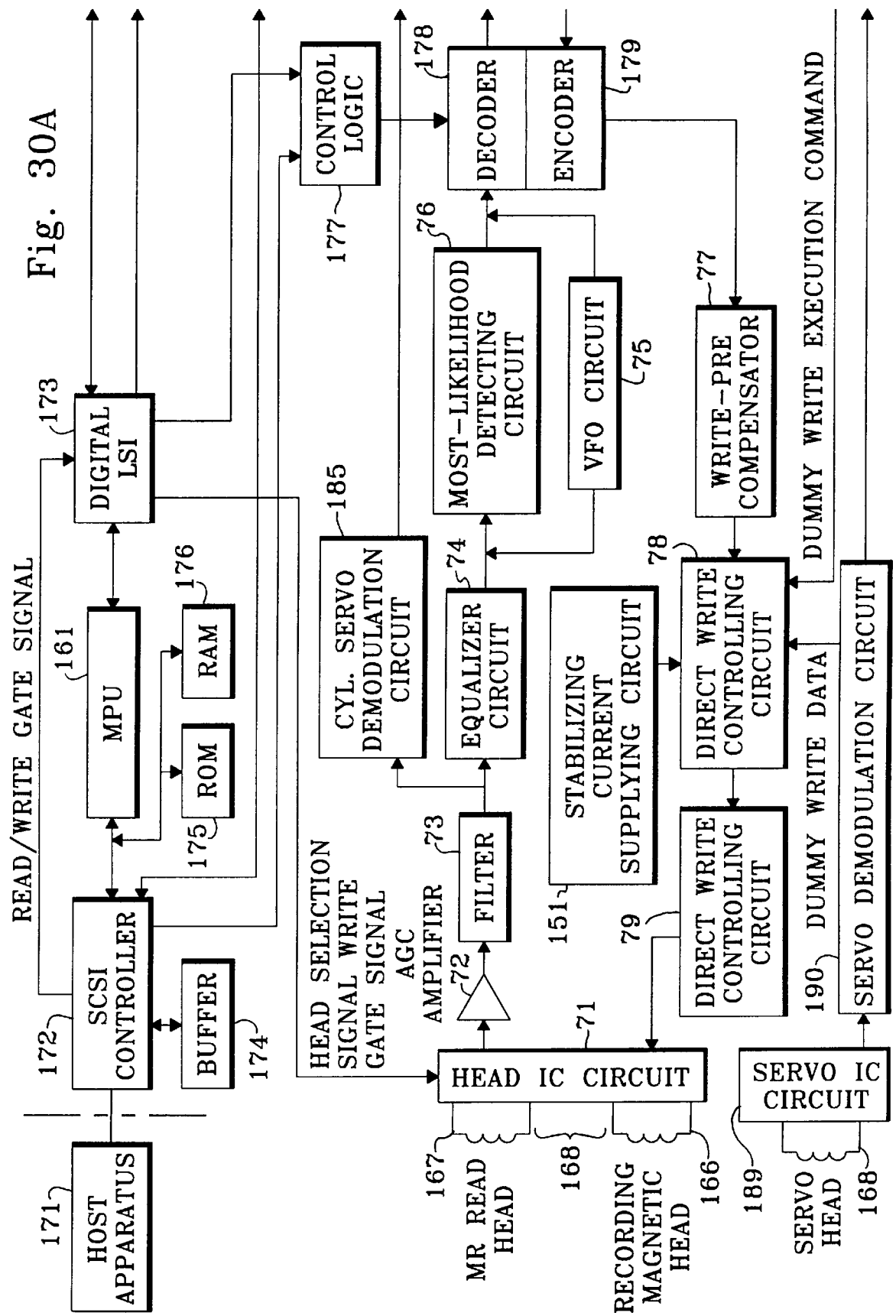
FIG. 30 is a block diagram of the seventh embodiment of a magnetic disk apparatus according to the present invention.

FIG. 30 is a block diagram of the seventh embodiment of a magnetic disk apparatus according to the present invention.

In a magnetic disk apparatus 170 shown in FIG. 30, commands supplied by an external host computer 171 are input to the MPU 161 via a SCSI controller 172. The commands output from the MPU 161 is sent via a digital LSI 172. A read/write gate signal is supplied from the SCSI controller 172 to the digital LSI 173. The SCSI controller 173 is provided with a buffer 174 comprising a dynamic random access memory (DRAM). The MPU 161 is provided with a read only memory (ROM) 175 and a random access memory (RAM) 176.

A read gate signal is supplied to a control logic 177 by the SCSI controller 172, and a write gate signal is supplied to the control logic 177 by the digital LSI 173. The control logic 177 outputs either one of the read signal and the write signal to a decoder 178 and an encoder 179 provided in a recording/reproducing system. The control logic 177 corresponds to the write-gate-signal outputting means 162 shown in FIG. 29.

A digital signal processor (DSP) 180 as a driving system performs a signal transmitting operation with the digital LSI 173. The DSP 180 drives a DC motor 182 which rotates the magnetic disk via a spindle motor driver 181. The DSP 180 also drives a voice coil motor (VCM) 184 which moves the magnetic head 168 via a VCM driver 183. The DSP 180 corresponds to the seek controlling means 164 shown in FIG. 29.

Since a recording/reproducing system of this embodiment has the same structure as that shown in FIG. 10, parts that are the same as parts shown in FIG. 10 are given the same reference numerals, and descriptions thereof will be omitted.

The write gate signal and a head selection signal are supplied to the head IC circuit 71 by the digital LSI 173. An output from the filter 73 is supplied to the DSP 180 via a demodulation circuit 185 which demodulates a cylinder servo information signal of the magnetic disk.

A reproducing data train supplied by the most-likelihood detecting circuit 76 and a synchronous clock signal supplied by the VFO circuit 75 are decoded by the decoder 178. The decoded signal is sent to the SCSI controller 172 after being converted into a parallel reproducing signal by a serial/parallel (S/P) converting circuit 186. The write data is supplied to the encoder 179 after being converted into a serial signal train, and then supplied to the write pre-compensator 77.

If the magnetic disk apparatus 170 uses a servo-surface-servo system having a servo disk, servo information data read out by a servo head 188 is sent to a servo demodulation circuit 190 via a servo IC circuit 189. The servo modulation circuit 190 demodulates the servo information data and sends it to the DSP 180. The servo demodulation circuit 190 also sends the dummy-write-data to the direct write controlling circuit 78. The servo demodulation circuit corresponds to the dummy write data outputting means 163 shown in FIG. 29 A dummy write execution command (the write gate signal) is then input to the direct write controlling circuit 78 from the MPU 161 via the digital LSI 173.

If the controlling system of the magnetic disk apparatus 170 uses a data-surface-servo system, the servo head 188 and the servo IC circuit 189 are not needed. Servo information data obtained from a data surface is demodulated by the demodulation circuit 185, and then sent to the DSP 180.

Figure 31:
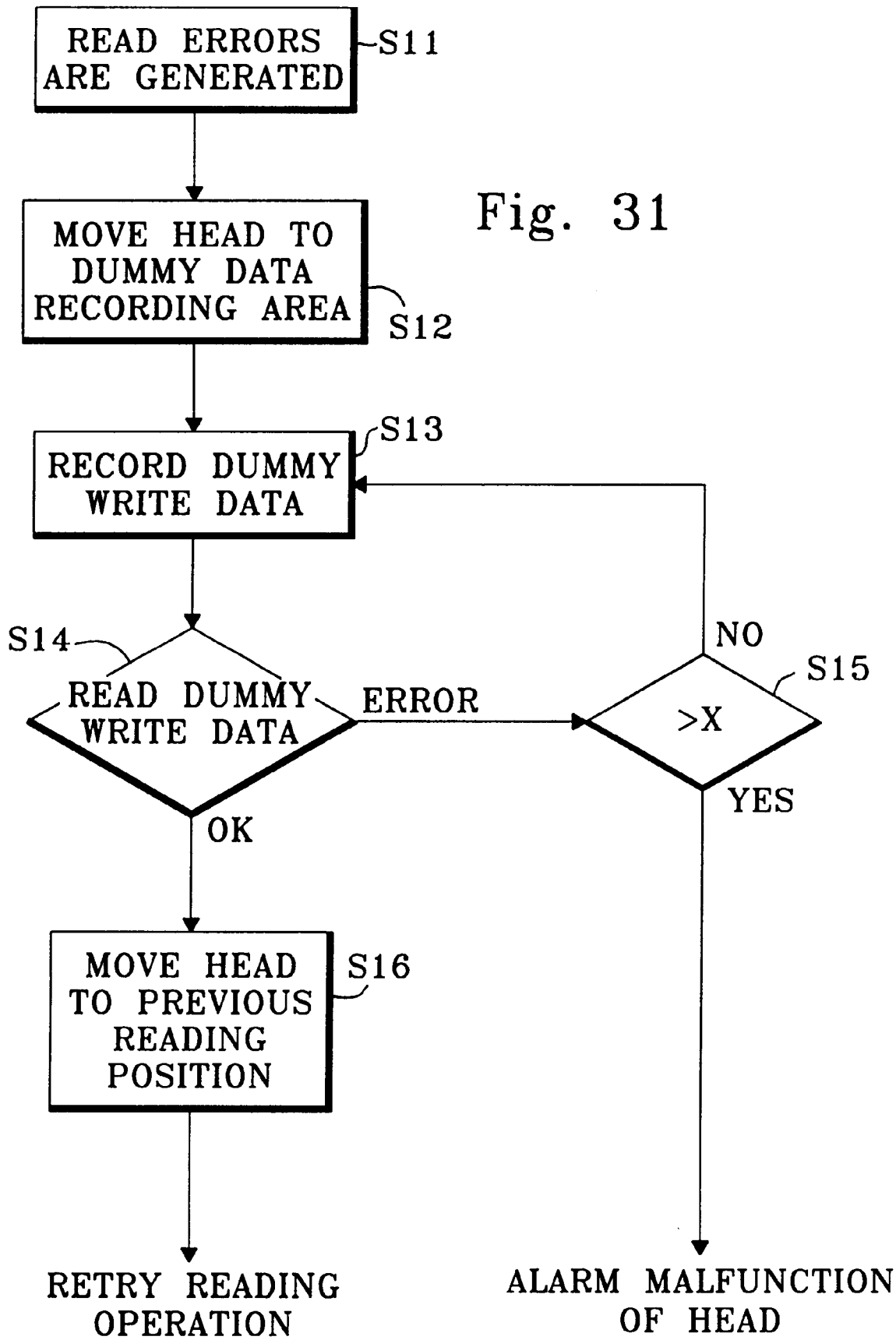
FIG. 31 is a flowchart of an erase process.
Figure 32:
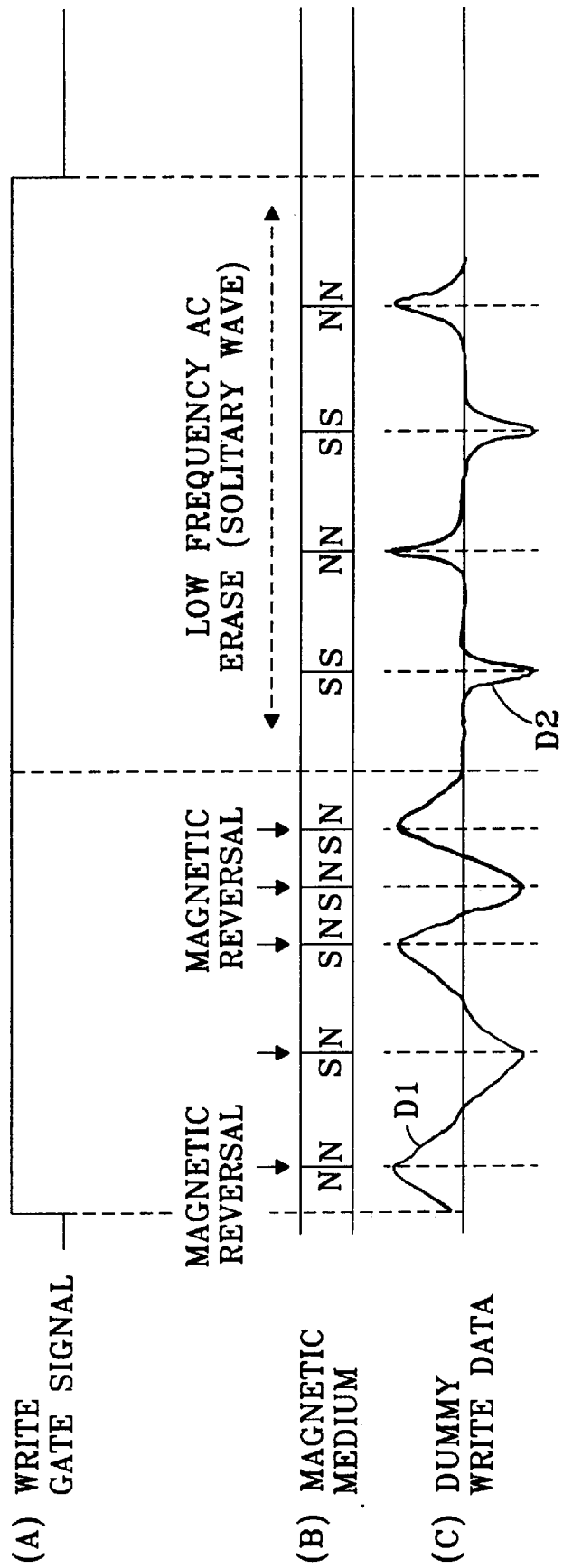
FIG. 32 is a timing chart of an AC erase process.

A description will now be given of an erase process performed in this embodiment. FIG. 31 is a flow chart of an erase process. FIG. 32 is a timing chart of an AC erase process.

When read errors, of which amount are not corrected by performing a retry, are generated in S11, the magnetic head 168 is moved, in S12, to the dummy-data recording area 61a of the magnetic disk 61A. When a seeking operation of the magnetic head 168 is completed, the write gate signal as the dummy write execution command is input to the direct write controlling circuit 78 (refer to FIG. 32-(A)). At the same time, the dummy write data is supplied to the head IC circuit 71 by the servo demodulation circuit 190, and thereby a current is supplied to the write head 166 (refer to FIG. 32-(C)). Accordingly, the dummy write data is recorded, in S13, in the dummy data recording area 61a of the magnetic disk 61A (refer to FIG. 32-(B)).

The dummy write data comprises a predetermined dummy data D1 which is quasi recording information and AC erase data D2. As shown in FIG. 32, an alternate current corresponding to the AC erase data D2 is supplied to the recording magnetic head 166 for a predetermined period after the dummy data D1 is recorded. The alternate current corresponding to the AC erase data D2 forms a low frequency solitary wave. Current supplying periods for the dummy data D1 and the AC erase data D2 are determined by the write gate signal as shown in FIG. 32-(A).

The magnetized state of the shield (magnetic pole or flux guide) positioned between the recording head 166 and the MR read head 167 of the magnetic head 168 is rendered to be a stable state by means of the low frequency alternate current corresponding to the AC erase data D2.

In S14, the dummy write data are read, and it is determined whether or not a read error is detected. If a read error is detected, it is then determined, in S15, whether or not the number of detections of read error exceeds a predetermined value X. If it is determined that the number of detections of read error does not exceeds the value X, the routine returns to S13 to perform another recording of the dummy write data. If it is determined, in S15, that the number of detections of the read error exceeds the value X, the routine proceeds to a process in which an alarm is generated for notifying an occurrence of a malfunction of the magnetic head 168.

If it is determined in S14 that the read error is not present, the routine proceeds to S16. In S16, the magnetic head 168 is moved to a previous cylinder position where the read errors were generated so as to retry a reading operation.

Accordingly, in this embodiment, by performing the AC erase after the dummy data D1 is recorded, generation of the residual magnetization is prevented. Additionally, if it is determined that the number of detections of the read error exceeds the predetermined value X, it is recognized that the magnetic head is in an abnormal state.

Figure 33:
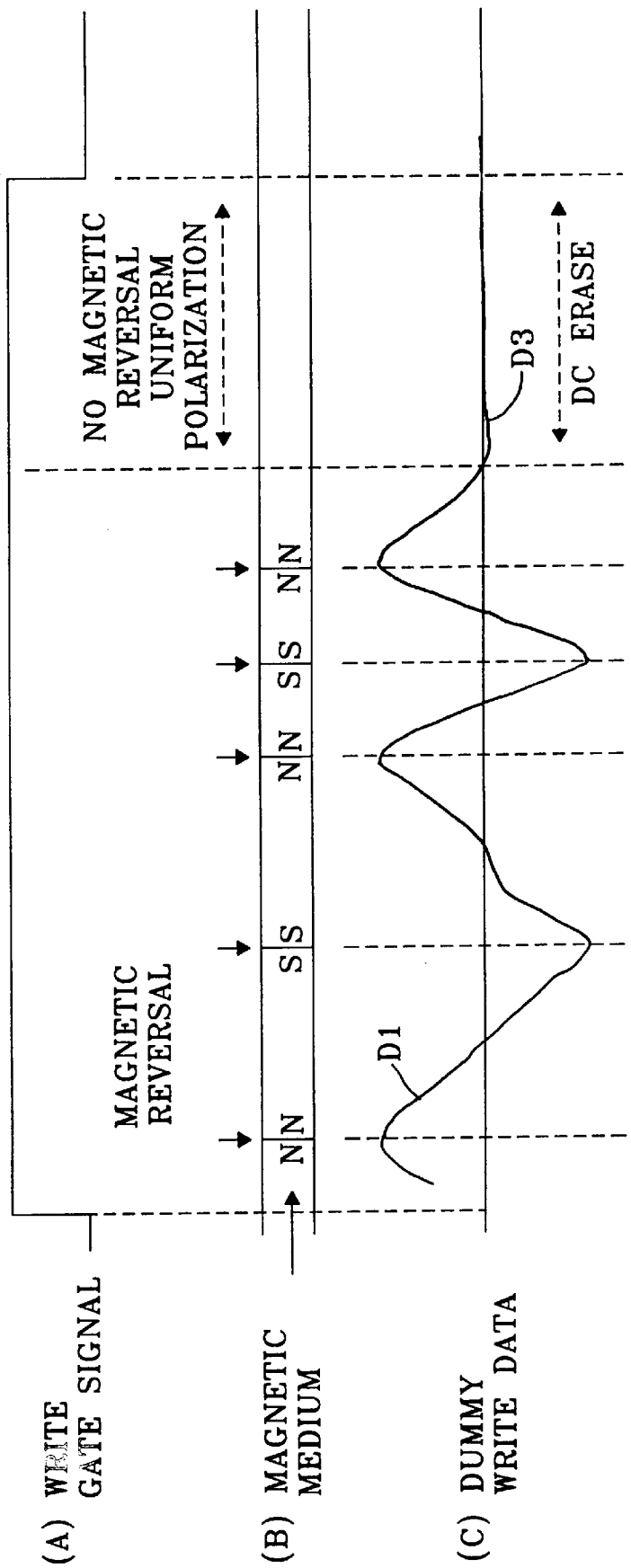
FIG. 33 is a timing chart of a DC erase process.

FIG. 33 is a timing chart of a DC erase process. In the DC erase process, a DC current corresponding to DC erase data D3 is supplied instead of the AC current of the above-mentioned AC erase process. The DC current corresponding to the DC erase data D3 is supplied to the recording magnetic head 166 in a reverse direction of a current corresponding to the last data of the dummy data D1 recorded by the recording magnetic head 166. A level of the DC current is determined to be sufficient for stabilizing the magnetization of the magnetic pole.

FIG. 34 shows results of experiments for investigating changes in an output of the reproducing magnetic head in the seventh embodiment.

As shown in FIG. 34, measurements were taken for five magnetic heads so as to investigate a difference in output of the reproducing magnetic head before a dummy write operation and after the dummy write operation. The measurements were taken by supplying to the magnetic head an AC current of 40 MA for 1 MFRPS, 10.5 MFRPS and 63 MFRPS. Another measurements were taken by supplying a DC current of 40 mA. In this measurement, an average output was defined as 100%, and a difference between an output percentage before the dummy write operation was performed and an output percentage after the dummy write operation was completed. For example, for magnetic head No. 1, an output percentage before the dummy write operation was −10.8%, that is 89.2% of the average output, and an output percentage after the dummy write operation was +4.3%, that is 104.3% of the average output. Accordingly, an output increase of 15.1% (104.3−89.2=15.1%) was obtained for the magnetic head No. 1. It should be noted that a lone mark "−" in a box in FIG. 34 represents that no measurement was taken.

As shown in FIG. 34, a probability of recovering the output more than the average output was about 50% when erase times of 1 MFRPS and 10.5 MFRPS corresponding to the AC erase data D2 are used. However, when an erase time of 63 MFRPS is used, a probability of only 20% was obtained. Accordingly, a low frequency AC current is preferable when the AC erase is performed. A probability of 65% was obtained for the DC erase, although measurements were taken for only one magnetic head.

FIG. 35 shows probability of output increase for various dummy write periods when the AC erase is performed. Dummy write periods (erase periods) of 10 $\mu$sec, 20 $\mu$sec and 30 $\mu$sec were used. It should be noted that when a DC erase is performed, the erase period may be a few microseconds which is sufficient for moving the domain wall of the magnetic shield of the magnetic head 168.

As mentioned above, by recording the dummy data when read errors are generated and thereafter performing the AC erase or DC erase by supplying the AC or DC current to the recording head, the residual magnetization remaining at the end of the magnetic shield of the magnetic head 168 can be stabilized. Accordingly, the occurrence of an error in a reproducing signal caused by a deformation of the reproducing signal waveform can be prevented, and recovery of the read error can be easily performed. Additionally, a malfunctioning magnetic head can be easily recognized which results in improvement of reliability of the magnetic disk apparatus.

The present invention is not limited to the specifically disclosed embodiments, and variations and modifications may be made without departing from the scope of the invention.

What is claimed is:

1. A magnetic recording/reproducing apparatus including a magnetic recording medium, comprising:

a thin-film magnetic head, comprising a magnetic pole and a dual-function coil provided near said magnetic pole, for recording/reproducing information to/from said magnetic recording medium and for demagnetizing a residual magnetization remaining at an end of said magnetic pole; and a current supplying circuit which supplies a DC current to said dual-function coil, the DC current being supplied to said dual-function coil after a recording operation has been completed by said thin-film magnetic head, wherein said DC current flows in a direction opposite to a flowing direction of a corresponding last recording current previously supplied to said dual-function coil, and wherein said DC current is smaller than an amount of the corresponding last recording current.

2. The magnetic recording/reproducing apparatus as claimed in claim 1, wherein the value of the DC current supplied by said current supplying circuit is determined so that the DC current generates a magnetic field which is less than a value of coercive force of a material of said magnetic pole.

3. The magnetic recording/reproducing apparatus as claimed in claim 1, wherein a period of supplying time of the DC current supplied by said current supplying circuit is less than a minimum period of said recording information.

4. The magnetic recording/reproducing apparatus as claimed in claim 1, wherein said magnetic recording medium has a non-recording area on which no information is recorded, and said thin-film magnetic head is moved to said non-recording area when the DC current is supplied to said dual-function coil by said current supplying circuit.

5. The magnetic recording/reproducing apparatus as claimed in claim 1, wherein all of said DC stabilizing current is smaller than an amount of the corresponding last recording current.

6. A magnetic recording/reproducing apparatus including a magnetic recording medium, comprising:

a thin-film magnetic head comprising a recording magnetic head element and a reproducing magnetic head element arranged along a longitudinal direction of said thin-film magnetic head, said recording magnetic head element recording information to said magnetic recording medium by means of a recording current supplied to a dual-function coil provided in said recording magnetic head element, said recording magnetic element comprising a first magnetic pole and a second magnetic pole which serves as a magnetic shield so that a magnetic flux passes therethrough when the recording current is supplied to said dual-function coil, said reproducing magnetic head element generating a reproducing signal according to a magnetic flux which is provided by said magnetic recording medium and guided by said second magnetic pole;

said dual-function coil being provided for recording/reproducing information to/from said magnetic recording medium and for demagnetizing residual magnetization remaining at an end of said first and second magnetic poles; and a stabilizing current supplying circuit which supplies a DC stabilizing current to said dual-function coil so that the residual magnetization remaining at the end of said first and second magnetic poles is demagnetized before a reading operation is performed by said reproducing magnetic head element, wherein said DC stabilizing current flows in a direction opposite to a flowing direction of a corresponding last recording current previously supplied to said dual-function coil, and wherein said DC stabilizing current is smaller than an amount of the corresponding last recording current.

7. The magnetic recording/reproducing apparatus as claimed in claim 6, wherein said magnetic recording medium has a non-recording area on which no information is recorded, and said thin-film magnetic head is moved to said non-recording area when said DC stabilizing current is supplied to said dual-function coil of said magnetic recording head element.

8. The magnetic recording/reproducing apparatus as claimed in claim 6, wherein all of said DC stabilizing current is smaller than an amount of the corresponding last recording current.

* * * * *